April 13, 1954   S. D. RUSSELL   2,674,839
PICKUP AND BALER
Filed March 10, 1948   13 Sheets-Sheet 2
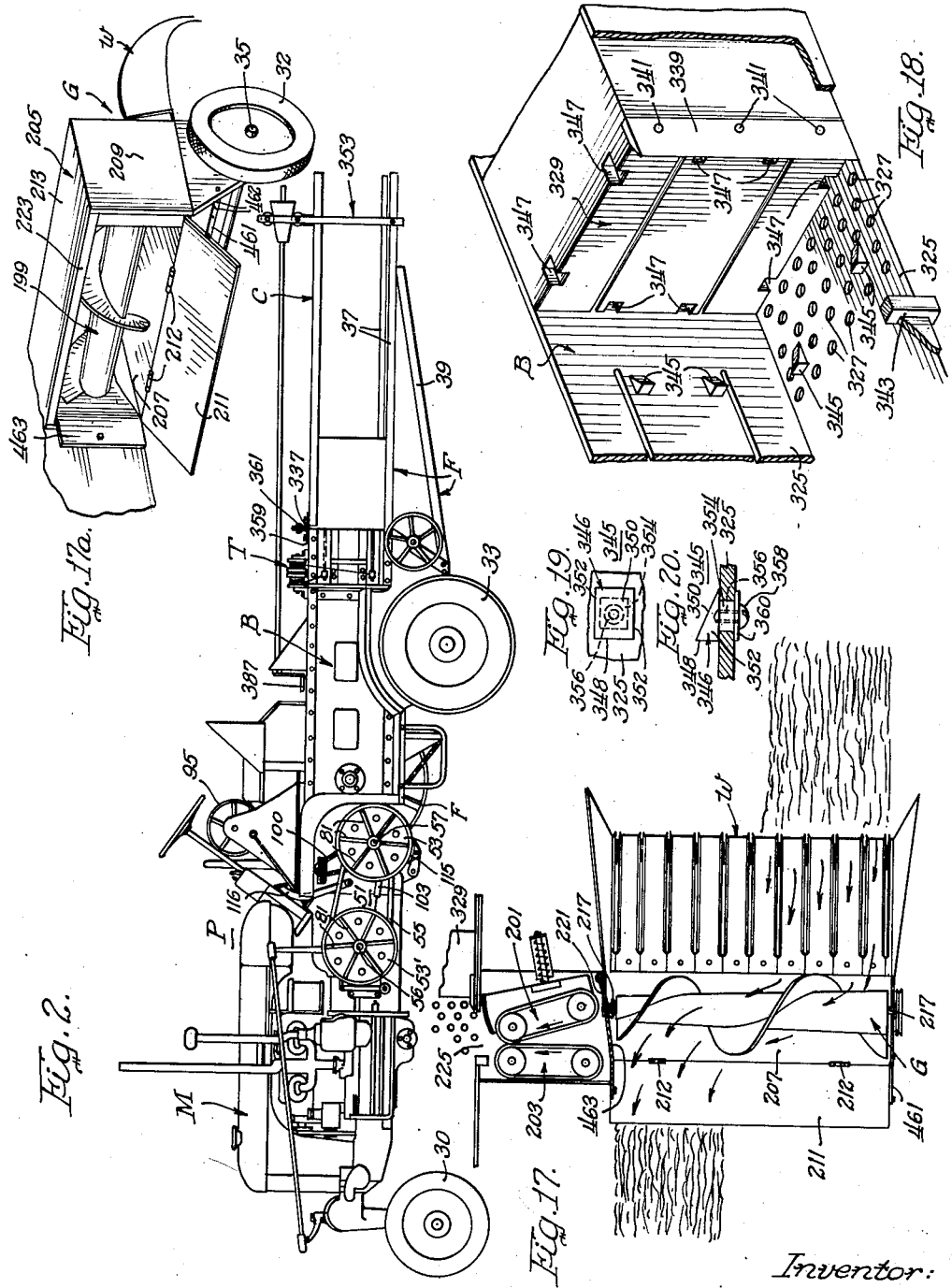
Inventor:
Stanley D. Russell.
By
Soans, Pond, & Anderson
Attys.

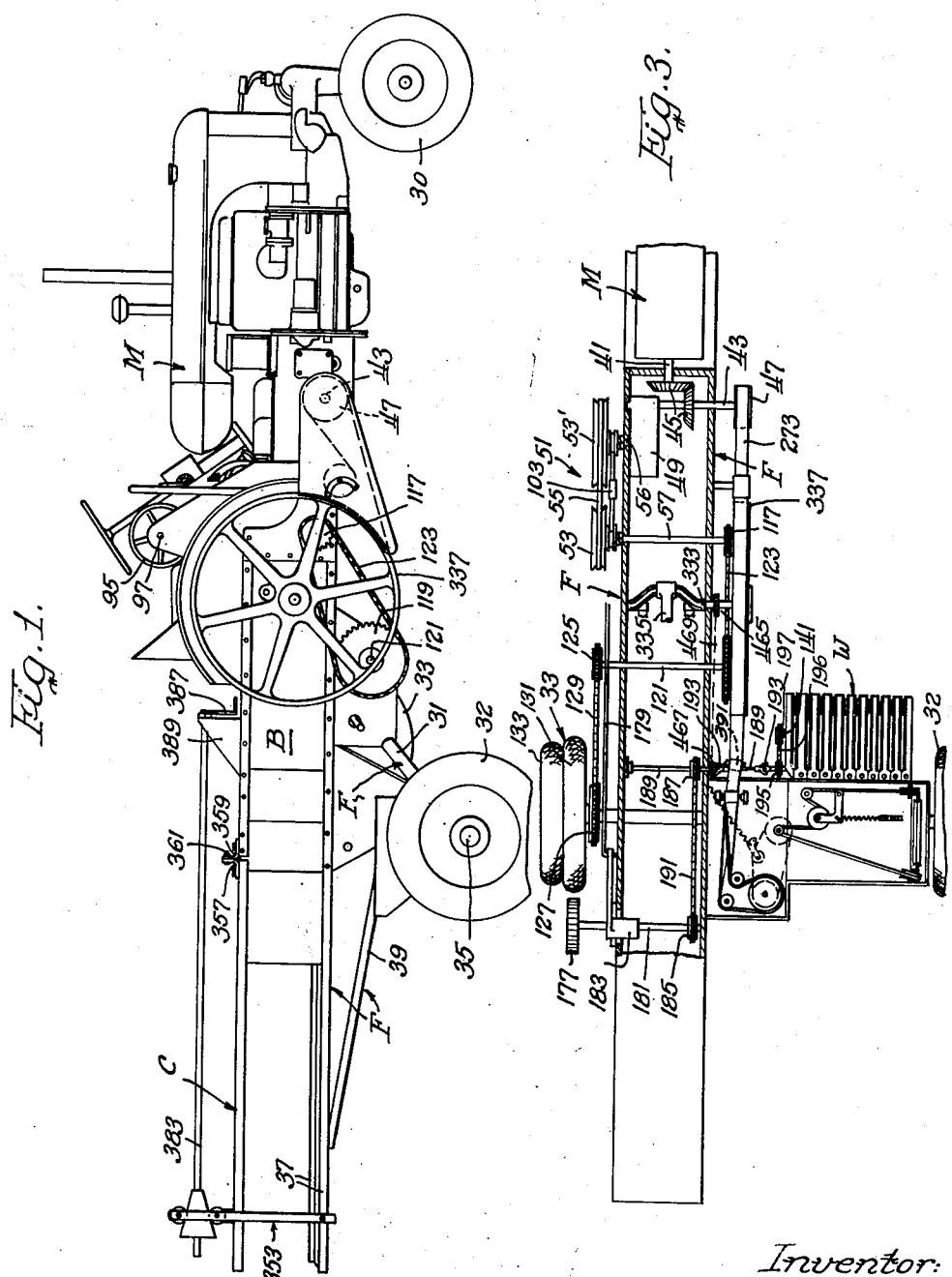

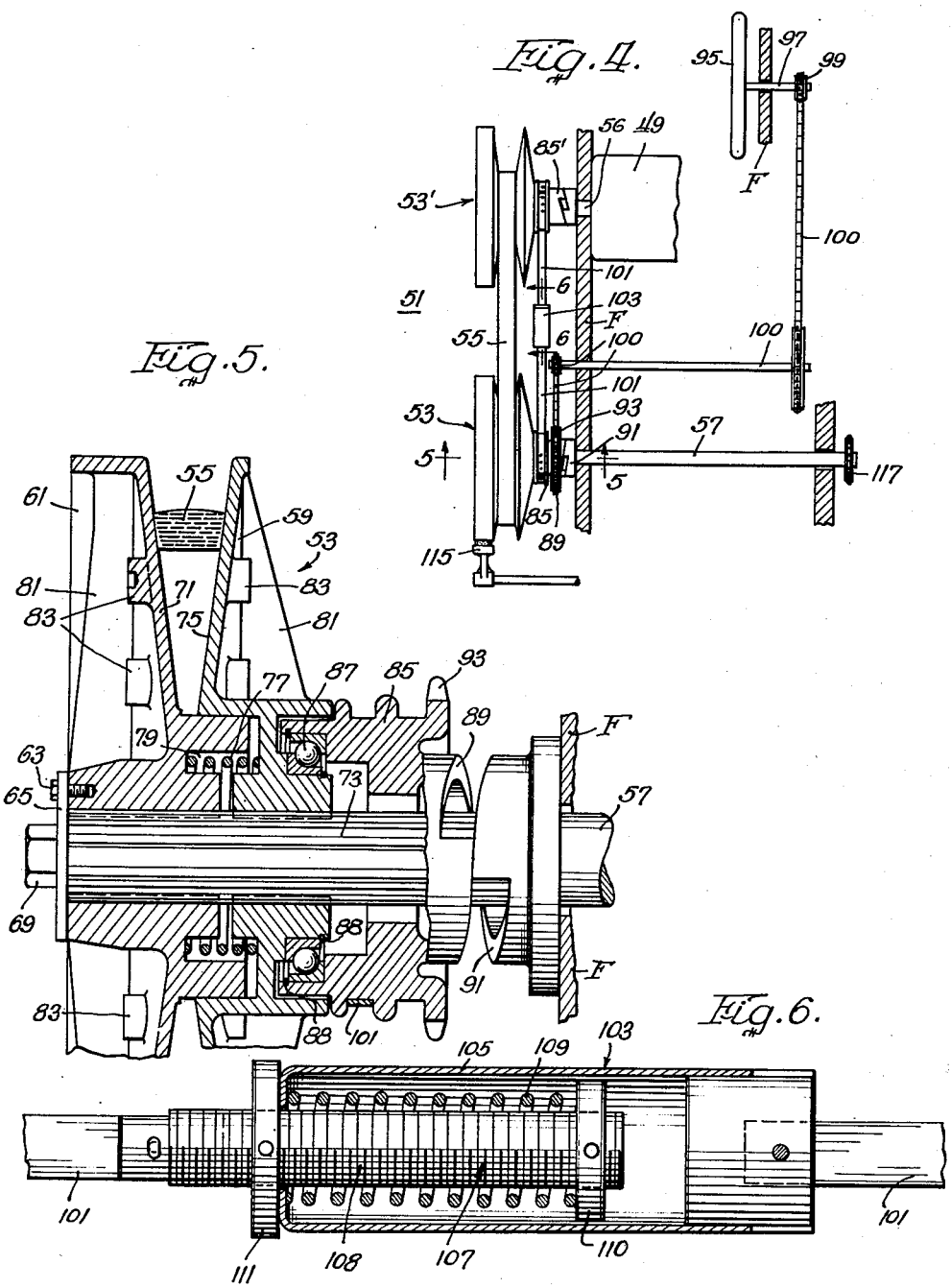

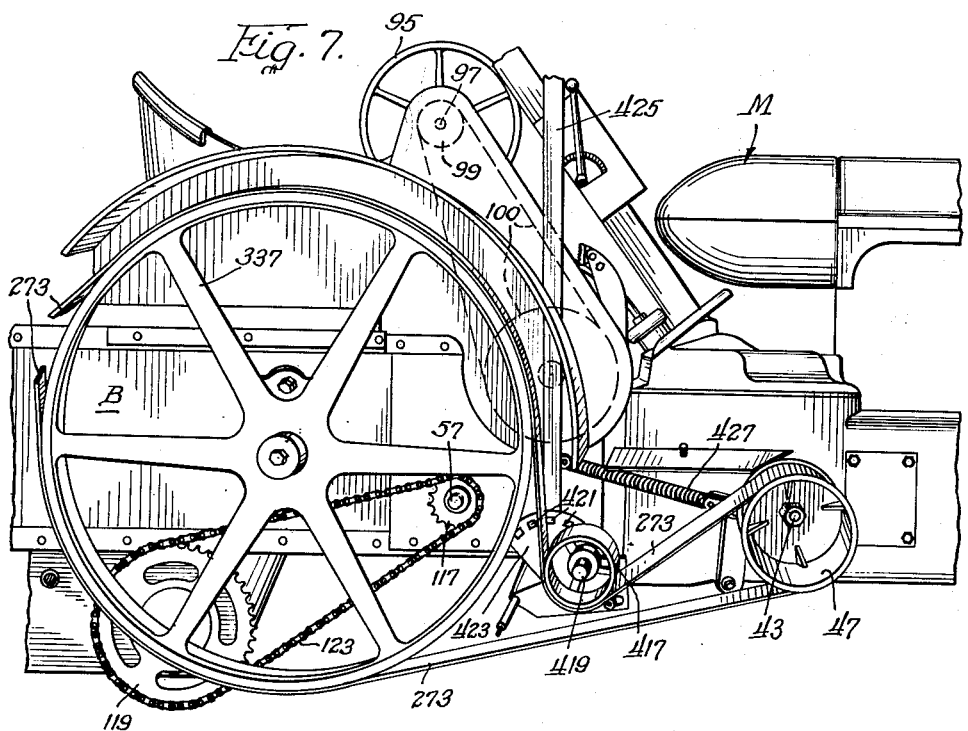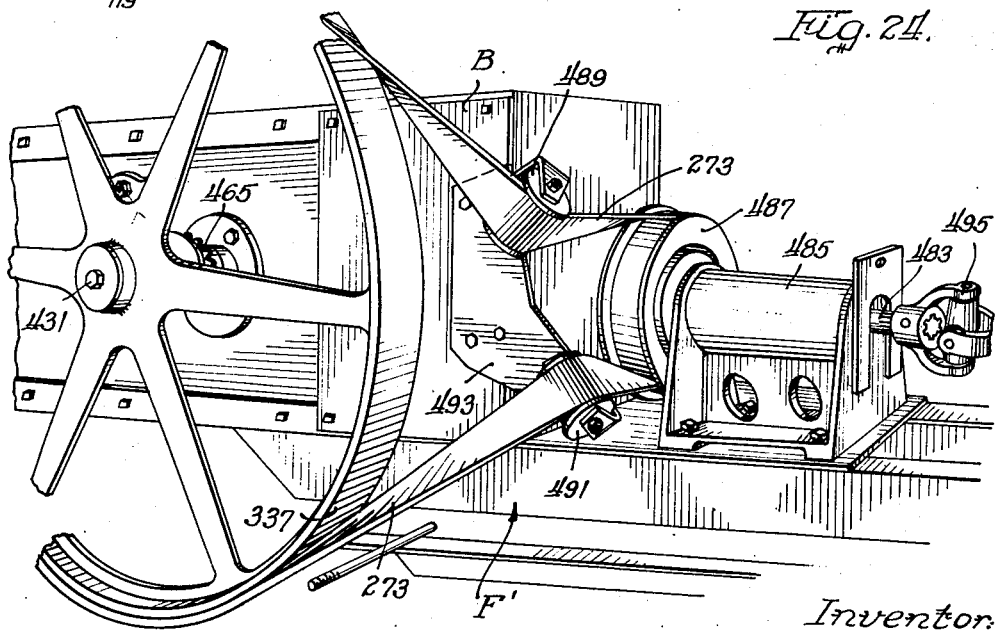

April 13, 1954

S. D. RUSSELL
PICKUP AND BALER 2,674,839

Filed March 10, 1948

Inventor:
Stanley D. Russell.
By Soans, Pond & Anderson
Attys.

April 13, 1954  S. D. RUSSELL  2,674,839
PICKUP AND BALER
Filed March 10, 1948  13 Sheets-Sheet 6
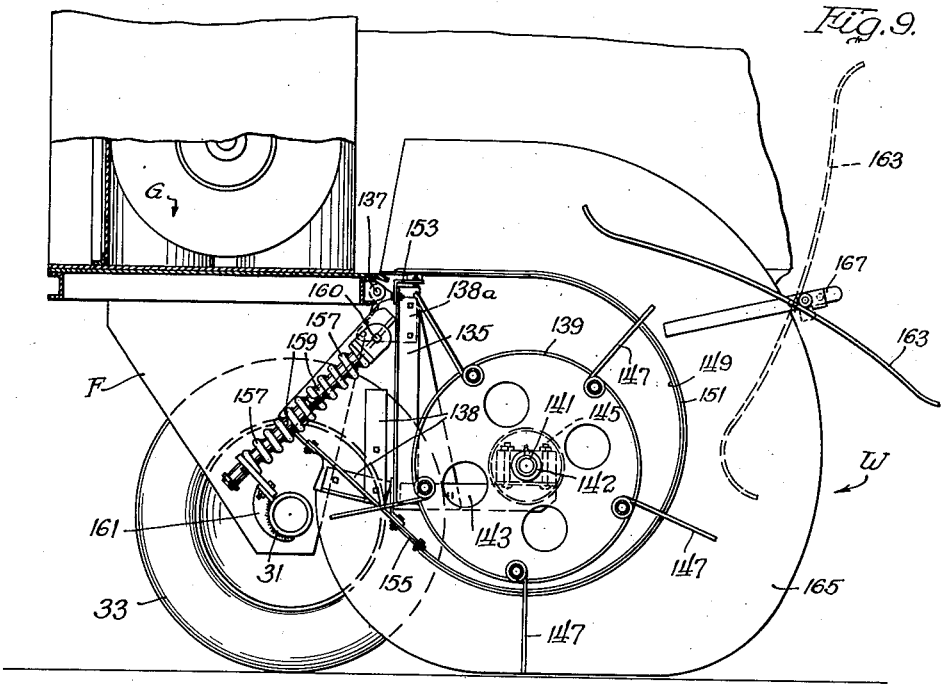
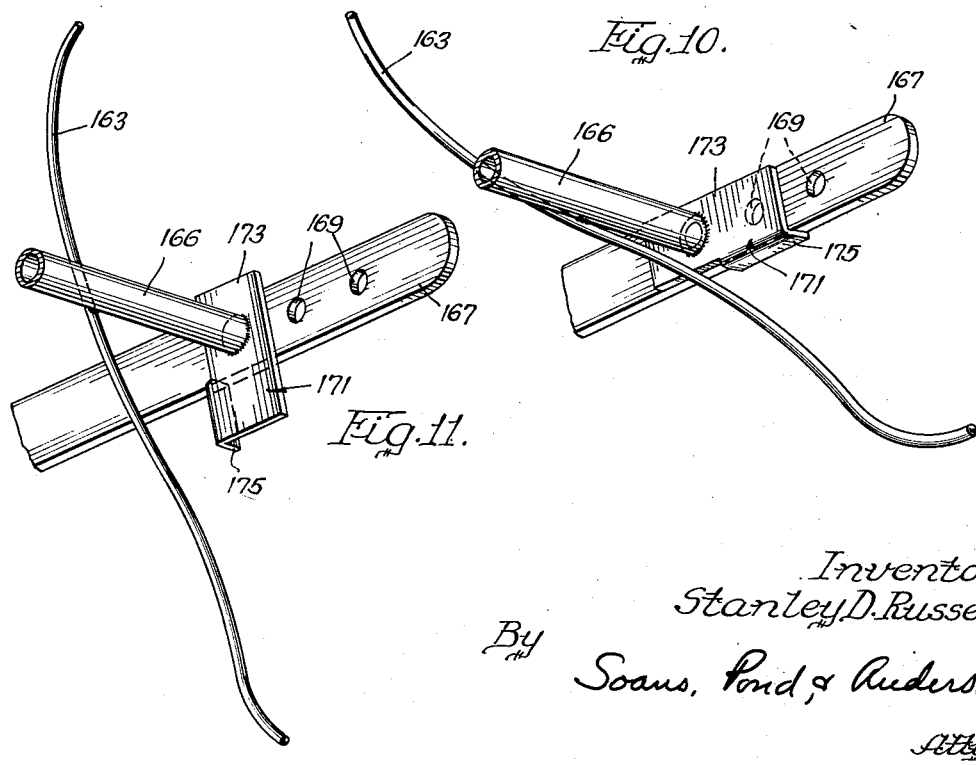
Inventor:
Stanley D. Russell
By Soans, Pond & Anderson
Attys

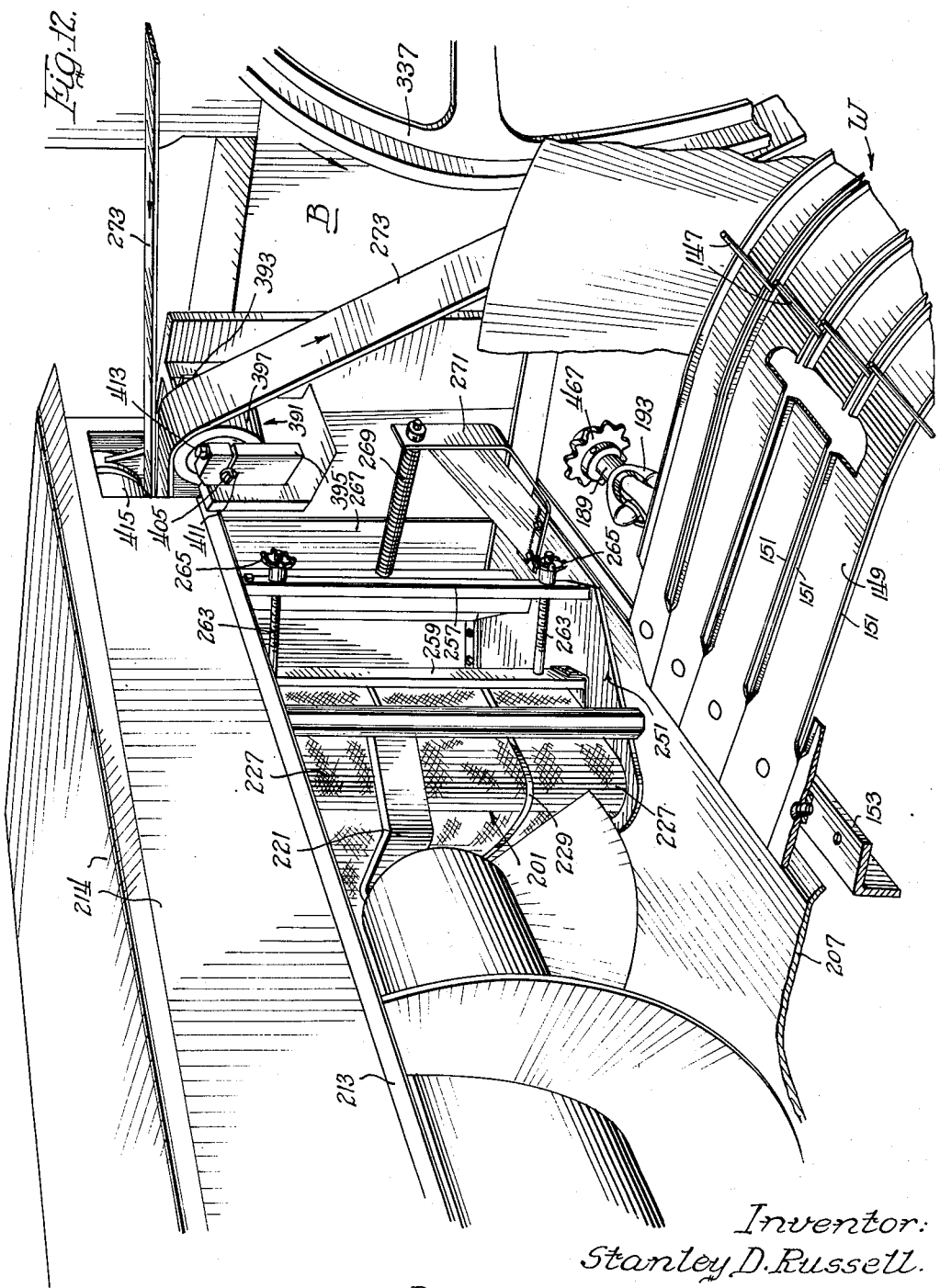

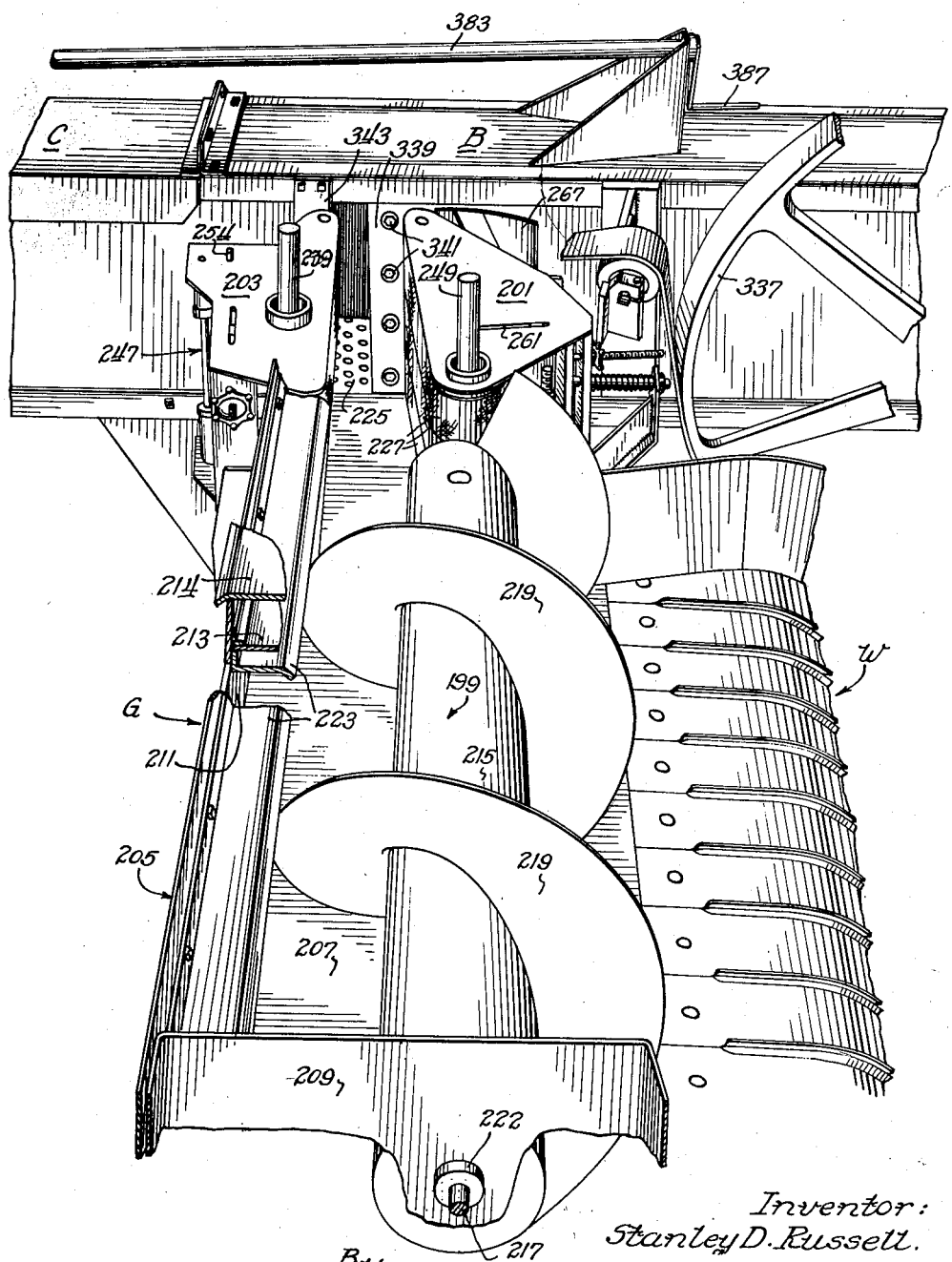

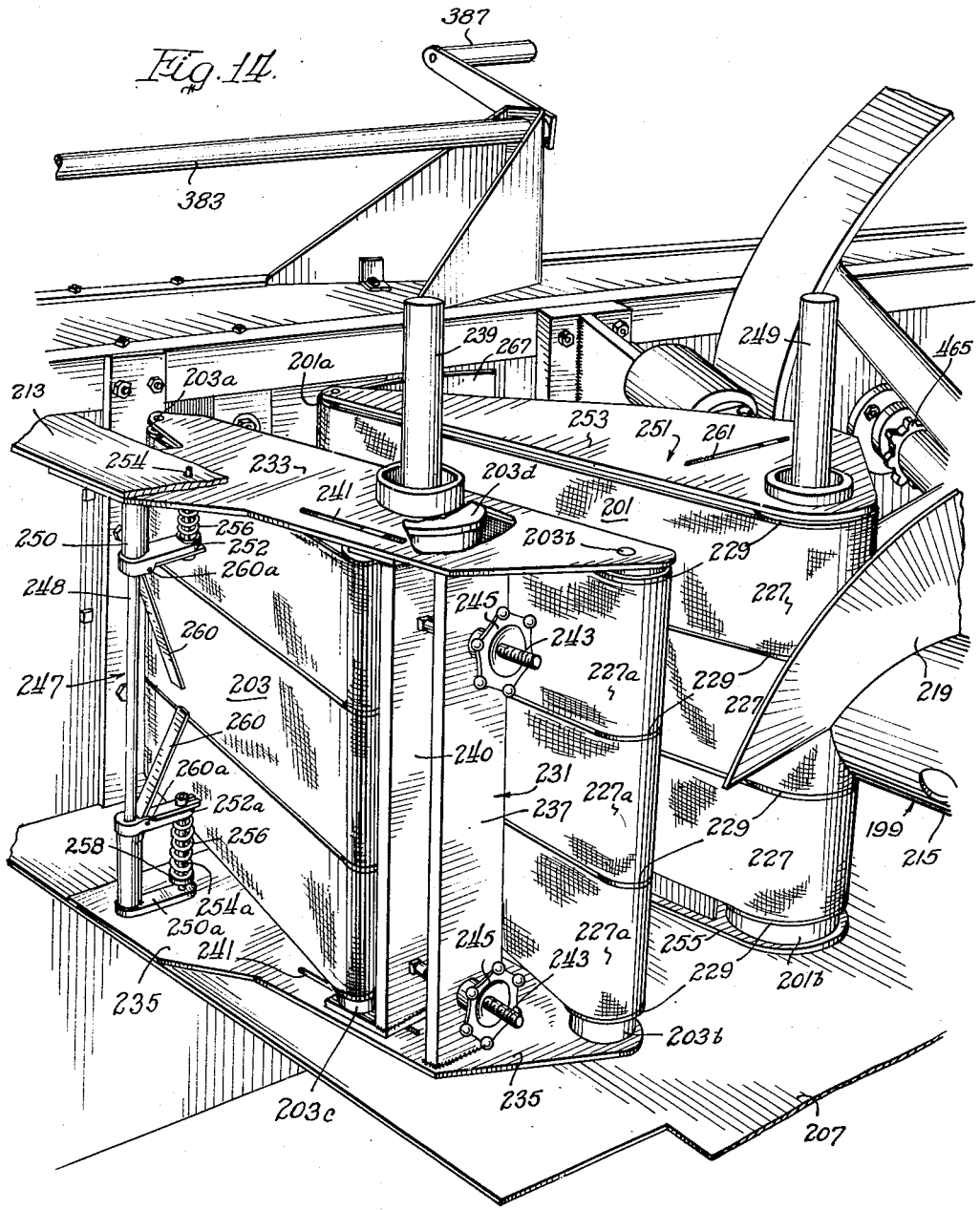

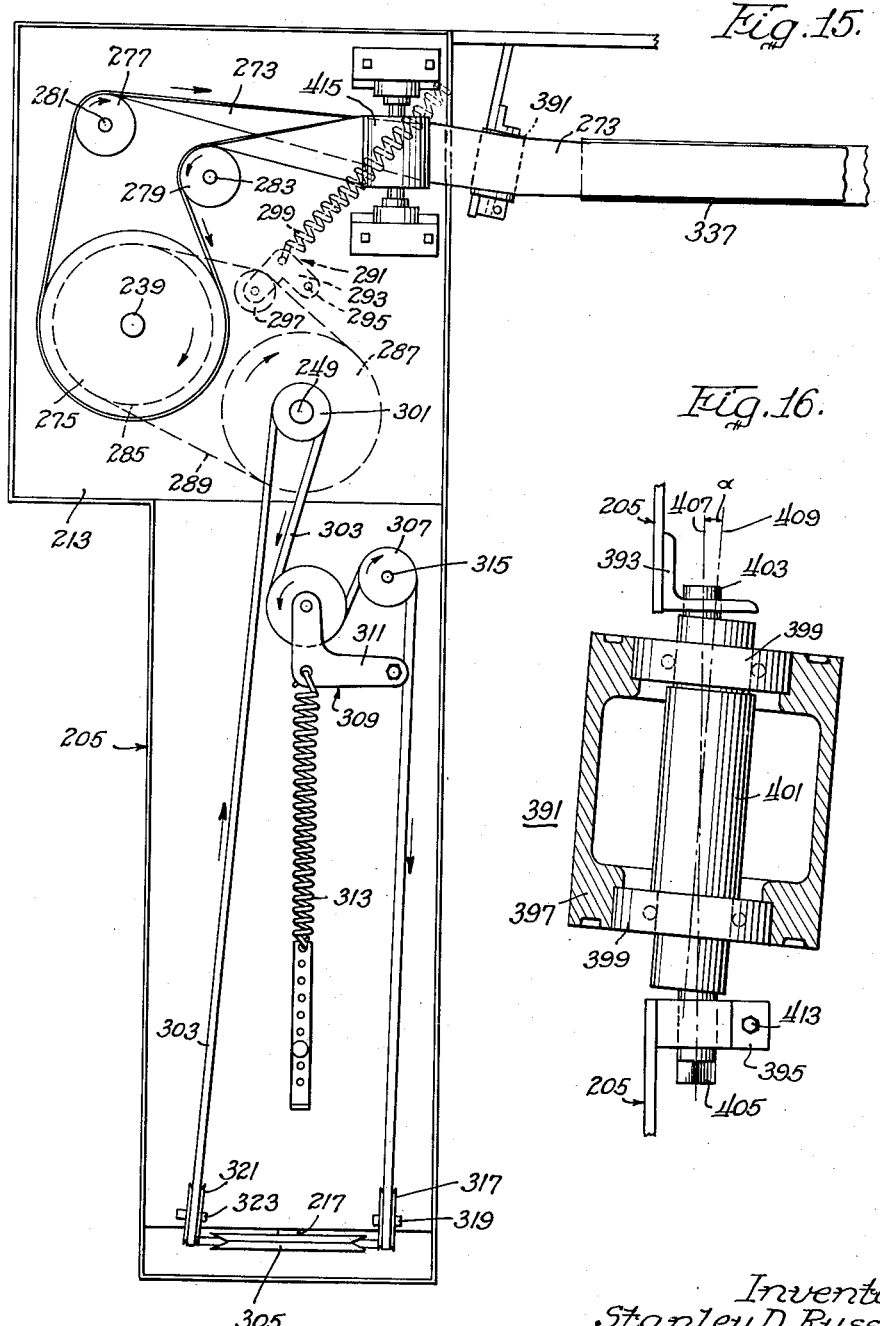

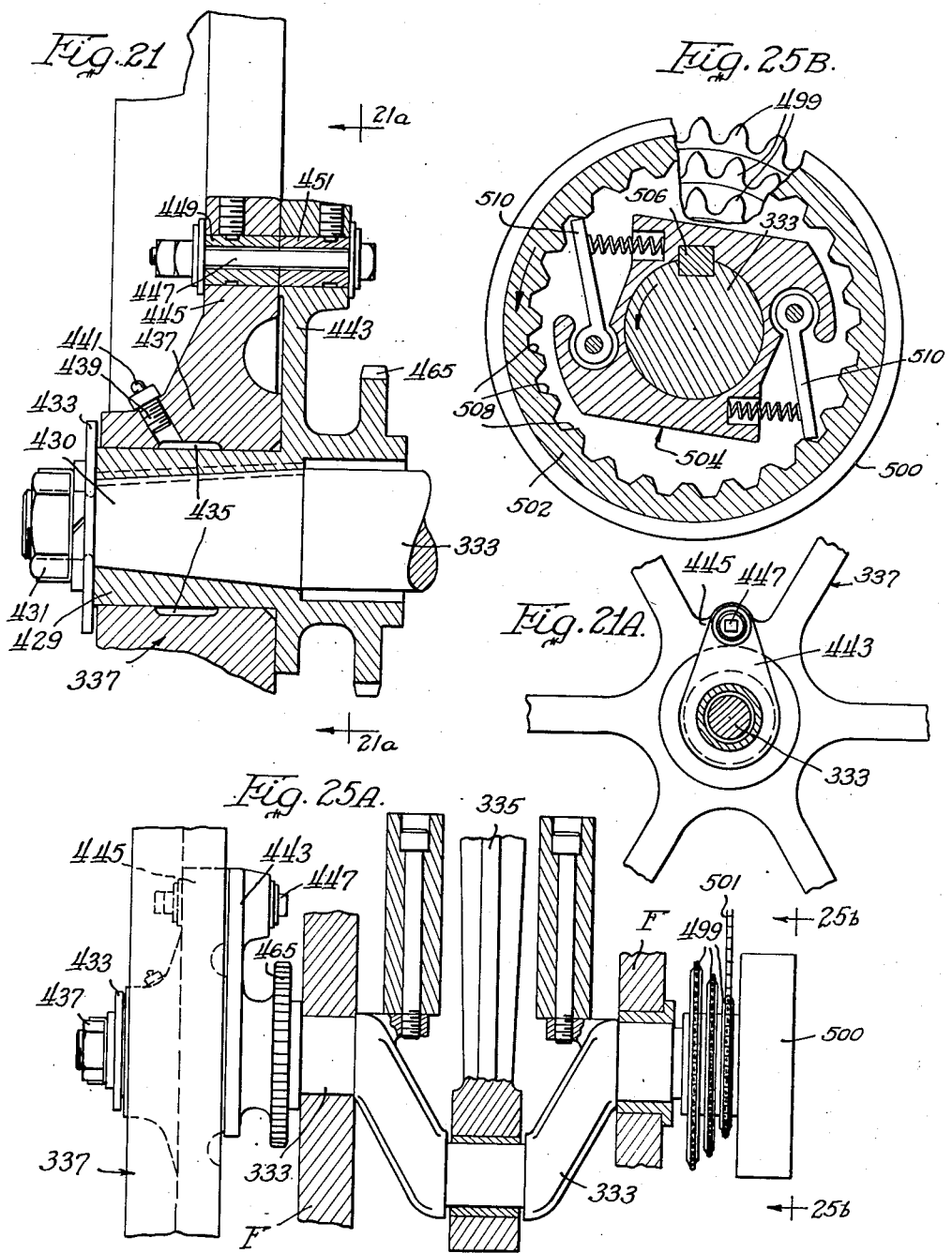

April 13, 1954

S. D. RUSSELL 2,674,839

PICKUP AND BALER

Filed March 10, 1948

Inventor:
Stanley D. Russell.
By Soans, Pond, & Anderson
Attys.

April 13, 1954   S. D. RUSSELL   2,674,839
PICKUP AND BALER
Filed March 10, 1948   13 Sheets-Sheet 13

Inventor:
Stanley D. Russell.
By Soans, Pond, & Anderson
Attys.

Patented Apr. 13, 1954

2,674,839

UNITED STATES PATENT OFFICE 2,674,839

PICKUP AND BALER

Stanley D. Russell, Racine, Wis., assignor to J. I. Case Company, Racine, Wis., a corporation of Wisconsin Application March 10, 1948, Serial No. 13,969

10 Claims. (Cl. 56—341)

The present invention relates generally to balers, and, in particular, relates to an improved pick-up baler construction.

When it is desired to store hay or the like in bales, the hay is cut by a mower and is then raked into long swaths or windrows. The cut hay is allowed to cure in the windrows until it is in the proper condition for storage. When it is desired to bale the hay, there are two general methods which are used. The first method requires the use of a hay loader which is pulled along the windrow to convey the cut hay onto a suitable hay rack or the like. The picked up hay is carried to a stationary baler where it is compressed into bales of the proper size. The bales may then be stored in a loft in the usual manner.

The second, and more popular, method of baling, employs a pick-up type baler which is adapted to be moved along a windrow by a suitable draft means; the baler picks up the windrowed hay, bales it, and deposits the baled hay upon the ground or upon a trailing wagon. This method of baling requires much less labor, because the hay is handled only in the baled condition. The present invention relates particularly to the construction of pick-up balers.

The principal object of the present invention is to provide a novel and improved form of feed means for delivering material to a baling chamber. Another object of the invention is to provide an improved feed means, which compresses the material as it is fed into the baling chamber. A further object is to provide a feed means of the type described which compresses the material into a relatively thin ribbon of substantially uniform density. Other objects and advantages will become apparent as the disclosure progresses with respect to the accompanying drawings, wherein:

Fig. 1 is an elevational view of the right hand side of the prime mover which forms a part of a self-propelled baler constructed in accordance with the invention;

Fig. 2 is an elevational view of the left side of the apparatus illustrated in Fig. 1;

Fig. 3 is a diagrammatic, plan view of the drive mechanism of a self-propelled baler constructed in accordance with the invention, with parts broken away;

Fig. 4 is a diagrammatic plan view of the variable speed V-belt assembly portion of the prime mover illustrated in Figs. 1 and 2;

Fig. 5 is an enlarged sectional view taken on line 5—5 of Fig. 4;

Fig. 6 is an enlarged sectional view taken on line 6—6 of Fig. 4;

Fig. 7 is an enlarged fragmentary, perspective view of the drive elements which operatively connect the prime mover to the baling mechanism, as illustrated in Fig. 1;

Fig. 9 is a sectional view of the pickup which is illustrated in Fig. 8, with parts omitted or broken away. This view is taken on a line which extends parallel to the line of draft of the implement;

Fig. 10 is an enlarged perspective view of one of the hold down strips used in the construction of the wind guard which forms a part of the pickup illustrated in Fig. 9;

Fig. 11 is a view similar to Fig. 10 showing the position of the hold down strips when the wind guard is in the alternative position;

Fig. 12 is an enlarged perspective view of a portion of the feeding mechanism which forms an important part of the invention;

Fig. 13 is a fragmentary, perspective plan view of the feeding mechanism illustrated in Fig. 12, some parts being cut away;

Fig. 14 is an enlarged perspective view of the feed belts which form a part of the feeding unit illustrated in the preceding figures;

Fig. 15 is a diagrammatic, plan view of the drive arrangement for the feeding unit;

Fig. 16 is an enlarged cross sectional view of the novel belt aligning pulley seen particularly in Fig. 15;

Fig. 17 is a schematic plan view of the pick-up unit, illustrating the use of the apparatus in accordance with the invention as a windrow mover;

Fig. 17a is a perspective view, similar to Fig. 17, which further illustrates certain features of the apparatus when in use as a windrow mover;

Fig. 18 is an enlarged fragmentary, perspective view of the baling piston and its associated baling chamber;

Fig. 19 is an enlarged plan view of one of the novel wedges forming a part of the baling chamber illustrated particularly in Fig. 18;

Fig. 20 is an elevational view of the structure in Fig. 19;

Fig. 21 is an enlarged fragmentary view of a structure in Fig. 25a, with parts broken away and in section;

Fig. 21a is a reduced scale view taken on line 21a—21a of Fig. 21;

Fig. 24 is a perspective view of the drive arrangement which is employed when a baler in accordance with the invention is driven from a power take off shaft;

Fig. 25a is an enlarged sectional view taken generally along the line 25a—25a in Fig. 25, with parts broken away and in section to more clearly show certain structural features;

Fig. 25b is an enlarged sectional view taken on line 25b—25b in Fig. 25a, with parts broken away and in section.

Figure 8:
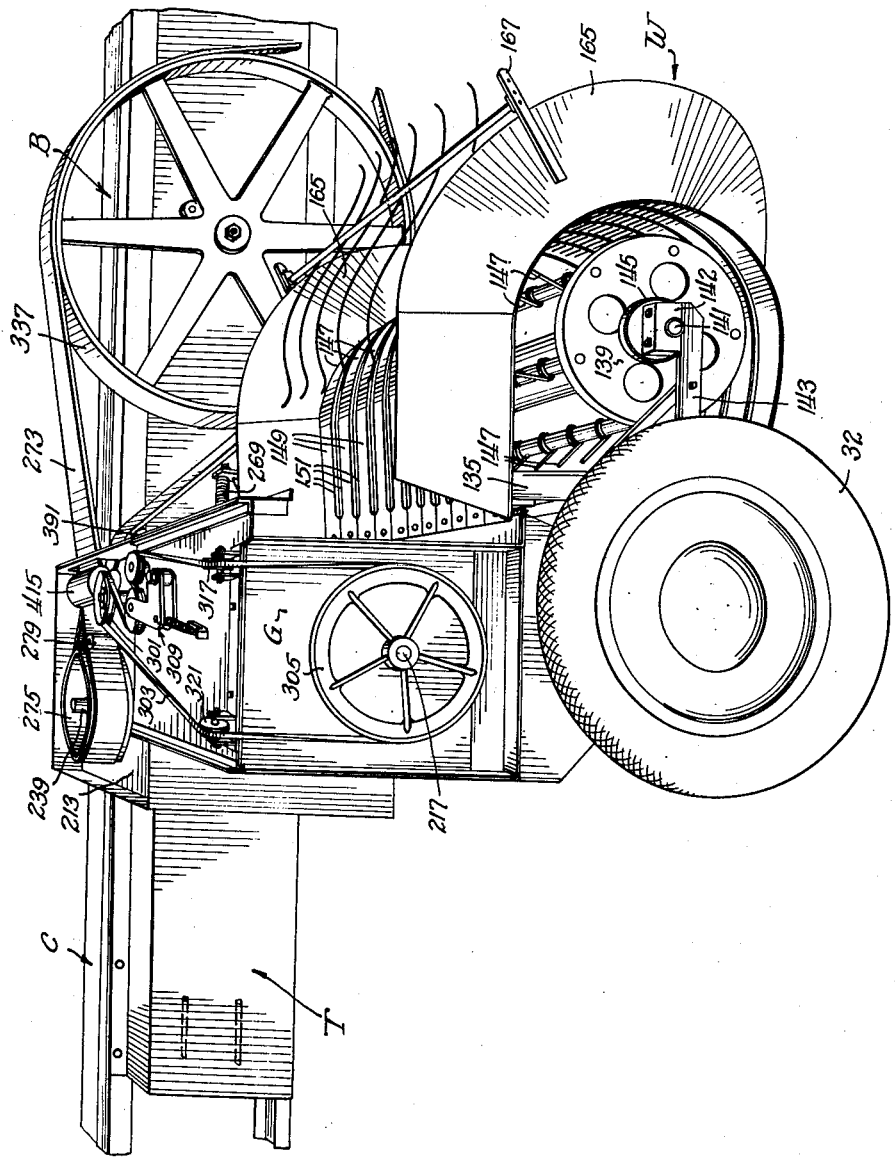
Fig. 8 is an enlarged perspective view of the improved windrow pick-up which forms a part of the baler of the invention.

Pick-up balers are of two general types; the pull-type and the self-propelled type. The self-propelled baler includes, as an integral unit, a prime mover which is adapted to move the implement about the field as well as to provide the power to drive the various mechanisms which are necessary to the efficient operation of the baler. The pull-type implement is drawn by a tractor or other draft vehicle and is powered from a power take-off, from a separate engine, or from an operative connection to one of the ground wheels. The baler to be discussed in the greatest detail is of the self-propelled type, but it will be apparent that the various features of the invention are equally applicable to both types of balers.

This particular embodiment of a self-propelled baler comprises a prime mover P which includes a frame portion F on which are journalled suitable support wheels so that the apparatus can be moved about a field, a windrow pick-up unit W, a feeding unit G, a baling chamber B, an adjustable bale case C, and a bale tying or fastening means T. For convenience, the various elements of the implement will be individually discussed under several sub-titles.

*Prime mover*

The prime mover P, in the self-propelled baler, is adapted to support the various elements of the baler for movement about the field, and to provide the power which is necessary to energize the various mechanisms of the baler as well as the power which is required to move the baler about the field. The prime mover P includes a generally T-shaped frame F (Figs. 1 and 3) which comprises a longitudinally extending section which is adapted to be supported by a support wheel 30 at its forward end, a plurality of structural members which form the baling chamber B and the bale case C at the rearward end of the longitudinally extending section, and a transversely extending, outrigger-like frame 31 which is adapted to support the windrow pick-up W and the crop feeding means G. The wheel 30 supports the forward end of the longitudinally extending frame and a pair of spaced-apart support wheels 32 and 33 are journalled onto an axle 35 which forms a part of the outrigger-like frame 31.

In the structure illustrated, the forward end of the longitudinally extending frame and the motive power for the various elements are provided by the forward portion of a tricycle type, medium-sized, tractor M. The part of the tractor M which is employed in the structure, is that part which is normally ahead of the transmission, and includes the forward wheel assembly, the steering mechanism, the engine, the clutch, and the usual propeller shaft. The main structural members which form the rearward end of the longitudinally extending frame are a pair of rearwardly extending, parallel, spaced-apart angle members 37 (Figs. 1, 2, and 22) which form a suitable support under the baling chamber B and the bale case C. The angle members 37 are suitably braced by appropriate bracing members 39.

The power for the windrow pick-up unit W, the crop feeding unit G, and the baling mechanism and the power to move the implement about the field is transmitted from the engine by a propeller shaft 41 (Fig. 3) to a cross shaft 43 by means of a bevel gear set 45. The cross shaft 43 is journalled into suitable bearings on the frame F of the implement. A drive pulley 47 is keyed to one end of the cross shaft 43 and the pulley 47 is adapted to drive the various elements of the harvester. The other end of the cross shaft 43 is connected into a conventional, three-speed transmission and clutch combination 49, adapted to transmit the power necessary to move the implement about the field. Power is transmitted to the support wheel 33 from the three-speed transmission 49 by means of a novel V-belt, variable speed, drive assembly 51 and a series of chains and sprockets. The variable, V-belt, drive assembly 51 is adapted to be continuously adjustable so that the rate of movement of the baler can be maintained at the optimum baling speed.

The V-belt assembly 51 (Figs. 4, 5, and 6) includes a pair of spaced-apart, adjustable-width pulleys 53 and 53' which are connected by a V-belt 55. Pulley 53' is attached to the output shaft 56 of the three-speed transmission 49 and the other pulley, 53, is attached to a cross shaft 57 which is rotatably journalled in the main frame F. The end portion 73 of each of the shafts 56 and 57 is splined so that the spacing of the pulleys can be adjusted on the shafts.

The adjustable pulleys 53 and 53' are constructed in an identical manner so that in the following description only pulley 53 will be described. The pulley 53 includes an inner disc 59 which is movable toward and away from a fixed outer disc 61. The outer disc 61 is rigidly attached to the end of the shaft 57 by means of a cap screw 63 which engages a thrust plate 65 on the end of the shaft 57 (Fig. 5). The thrust plate 65 may be conveniently attached to the shaft 57 by means of a cap screw 69. The inner face 71 of the outer disc 61 tapers inwardly towards the center of the disc at the same slope as the face of the V-belt 55 so that a constant contact force will be maintained between the face of the belt 55 and the inner face 71 of the disc 61. The hub of the movable or inner disc 59 engages the splined portion of the shaft 57 and is movable longitudinally therealong. The outer face 75 of the inner disc 59 tapers outwardly so that it engages the inner face of the V-belt 55. The inner disc 59 may be biased inwardly, toward the frame F, by means of a coil spring 77 which can be disposed within a recess 79 in the hub portion of the outer disc 61 (Fig. 5). The inner and outer discs 59 and 61 respectively, are each provided with reinforcing webs 81 to strengthen the faces of the discs which co-act with the V-belts 55. In order that the pulleys may be statically and dynamically balanced, counter-weighting portions 83 are formed as an integral part of each of the discs and these may be drilled out to balance the assemblage.

Relative positioning of the inner and outer discs, 59 and 61, is accomplished by means of a sleeve 85 which is journalled for free rotation relative to the splined portion 73 of the shaft 57. A thrust-type ball bearing ring 87 is provided between the disc positioning sleeve 85 and the inner disc 59 so that the rotation of the inner disc does not rotate the sleeve 85; the ball bearing ring 87 is held in position by a pair of snap rings 88. The inner face 89 of the disc positioning sleeve 85 is a cam surface and this face co-acts with a complementary, mating, cam surface 91 fixedly attached to the main frame F. The forces resulting from rotation of the sleeve 85 and the resulting relative movement of the cam surfaces 89 and 91 will effect longitudinal movement of the sleeve 85 along the spline portion 73 of the shaft 57. This longitudinal movement of the sleeve 85 will, in turn, effect movement of the inner disc 59 outwardly relative to the outer disc 61 and the spring 77 or the tension of the belt 55 alone, will separate the discs when the disc adjusting sleeve 85 is rotated in the opposite direction.

The pulley 53' is provided with a cam-surfaced, adjusting sleeve 85' which is similar to the adjusting sleeve 85 which has been described in connection with pulley 53. The two sleeves are mechanically interconnected so as to move together by means of a pair of flexible strips of metal 101 which are joined by an adjustable, resilient, shock absorber and tensioning device 103 (Fig. 6). The pulleys are relatively positioned by means of the interconnected, disc-positioning sleeves 85 and 85' and any increase in spacing between the discs on one pulley will automatically decrease the spacing between the discs on the other pulley an equivalent amount. This assures the maintenance of the V-belt 55 at proper tension at all times.

Adjustment of the position of the sleeves 85 and 85' is accomplished by means of a sprocket 93 which forms an integral part of the sleeve 85 on the pulley 53. Movement of this sprocket is effected from a hand wheel 95 which is located on the baler frame within reach of the baler operator. The hand wheel 95 is keyed to a suitable shaft 97 which is journalled in the frame F, and a sprocket 99 attached to the shaft 97 is connected to the sprocket 93 on the sleeve 85 by means of a suitable chain and sprocket linkage 100.

The cam surfaces associated with the forward pulley 53' are a mirror image of the cam surfaces associated with the rearward pulley 53 so that upon rotation of the sleeves 85 and 85' in the same direction, the faces on one pulley will move apart while the faces on the other pulley will move together the same distance. This movement causes the effective diameter of each of the pulleys, as applies to the V-belt 55, to change, and thus makes possible smooth and accurate adjustment of the speed of the implement. In the structure illustrated, the connection between the positioning sleeves 85 and 85' is made on the lower side of each of the sleeves; but if the direction of the cam surfaces should be reversed, the connection would be made on the upper side of each of the sleeves.

Under some conditions it may be desirable to eliminate the pair of mating cam surfaces on one of the pulleys and the strip connecting means. In this case the effective diameter of the pulleys can be controlled by adjusting one of the pulleys in the described manner, and spring biasing the movable disc of the other pulley against the V-belt so that it automatically compensates for the change in diameter of the first pulley.

The resilient shock absorber 103 which joins the flexible strips 101 includes a body portion 105 which is attached at one end to one of the strips 101 and a plunger-like member which includes a threaded rod 108 having a spacer member 110 attached to its end. The spacer member 110 of the plunger-like member 107 is adapted to move within the body portion 105 and the other end of the threaded rod 108 is attached to the other of the flexible strips 101. The spacer member 110 is biased by means of a coil spring 109 within the body of the shock absorber 103 so as to resist longitudinal forces which tend to extend the strips 101. Adjustment of the spring tension in the shock absorber 103 is accomplished by means of a threaded, positioning bushing 111 which engages the threaded rod portion 108 of the plunger-like member 107 (Fig. 6). The bushing 111 abuts against the outer end of the body 105 of the shock absorber 103. A decrease in the overall length of the shock absorber increases the tension on the belt 55.

A brake for the implement may be provided by a brake shoe 115 which engages the rim of the outer disc 61 of the rear pulley 53 and the pressure of the brake shoe 115 may be conveniently controlled by means of a foot pedal 116 (Fig. 2) located near the baler operator.

A sprocket 117 is attached to the outer end of the cross shaft 57 and the sprocket 117 is connected to a sprocket 119 on a second cross shaft 121 by means of a chain 123. A sprocket 125 is keyed to the other end of shaft 121, and this sprocket is operatively connected by means of a chain 129 to a sprocket 127 attached to the ground wheel 33. Power is thus positively transmitted from the V-belt drive 51 to the drive wheel 33 by means of the sprocket and chain connections.

It will be noted that the two tires 131 and 133 on the drive wheel 33 are of differing sizes, the outer tire 133 having a diameter which is 2 to 3 inches less than the diameter of the inner tire 131. It has been found that this arrangement of the drive wheel tires provides more positive traction in a soft field and facilitates the efficient movement of the implement about the field by its single driven wheel.

The novel variable V-belt drive which has been described in the foregoing may be used either alone or in combination with a conventional three-speed transmission to accurately control the ground speed of the baler. However, the combination of the three-speed transmission and the variable V-belt drive permits extremely accurate adjustment between the speeds of the transmission without requiring unduly large variations in the effective diameters of the pulleys.

One of the important features of the drive unit is that the tractor engine is normally operated at a constant speed during the operation of the implement, while the ground speed is varied by means of the three-speed transmission and the variable V-belt drive. This feature of a constant engine speed and variable ground speed enables the operator to run the implement along the ground at the optimum speed for baling while, at the same time driving the baling mechanism at a constant speed from the engine. Thus, the baling mechanism can be operated to pick up the material to be baled at a substantially uniform rate, regardless of the size of the windrow. Also, the baling mechanism will be subjected to less wear because its speed does not vary when the speed of the implement along the ground is changed.

*Windrow pick-up unit*

The windrow pick-up unit, indicated generally as W in the drawings and particularly shown in Figs. 8 and 9, is adapted to pick the windrowed hay or other crop material from the ground and to move the picked-up material to the feeding unit G which conveys it into the baling chamber B. The pick-up unit W is hingedly mounted at the forward end of the feeding unit G and is adjustable in a vertical direction. The feeding unit G is in turn supported upon the outrigger-like frame 31, which extends transversely to the line of draft of the implement. The various elements of the windrow pick-up W are supported upon a suitable frame structure which includes, at either end thereof, a downwardly extending, generally triangular shaped plate member 135. The upper end of each of the plate members 135 is attached to the feeding unit G by means of a transversely disposed, horizontal hinge pin 137. The plates 135 are reinforced by suitable angle and plate members indicated at 138 and 138a in the drawings (Fig. 9).

The pick-up includes a rotatable, skeletonized, inner cylinder 139, supported upon a shaft 141 which is journalled in suitable bearings 142 attached to a pair of supporting arms 143. The rearward ends of the arms 143 are integrally attached to the plate 135. The bearings 142 at each end of the rotatable cylinder 139 are provided with a bearing guard 145 which prevents weeds and trash from winding about the bearing 142 and the shaft 141. The construction of the bearing guard 145 is described and claimed in my co-pending application Serial No. 778,643 which was filed on October 3, 1947 issued October 21, 1952, as U. S. Patent 2,614,405, and which is assigned to the assignee of the present invention.

The cylinder 139 supports a plurality of pick-up tines 147 which are arranged in rows and which are adapted to project between spaced-apart stripper plates 149 supported upon the frame of the pick-up. The stripper plates 149 define a generally cylindrical surface which extends around the cylinder 139. Each of the stripper plates 149 is fabricated from a single strip of metal having turned-up edges 151 which extend around the outer periphery of the cylindrical surface as shown particularly in Fig. 12. The turned-up edges 151 have important advantages over the prior arrangement. They reinforce the stripper plates 149 and aid in efficiently pulling the crop material off the pick-up tines 147. Also, they effectively prevent material from becoming wedged in the spaces between the stripper plates 149, thereby increasing the efficiency and reliability of operation of the complete apparatus.

The rearward edges of the upper portions of each of the stripper plates 149 are attached to a suitable transversely extending member 153 which extends between the end plates 135 of the pick-up unit frame (Fig. 9). The lower portions of the stripper plates 149 are joined together by a transversely extending member 155 which is attached at each end to one of the plate members 135. Thus, the stripper plates 149 and the rotatable inner cylinder 139 are both hingedly supported for vertical movement relative to the feeding unit G by means of the co-axial hinge pins 137.

The weight, or a large portion of the weight, of the windrow pick-up W is supported by means of one or more counter-balancing springs such as the pair of spaced apart, coiled, counter-balancing springs 157, each of which acts along a guide rod 159. The upper end of the guide rod 159 is hingedly attached to one of the reinforcing plates 138a by a hinge pin 160, and the lower end of the guide rod slides freely in a bracket 161 which is rigidly attached to the outrigger-like frame 31. The position of the pivot pins 137, the position of the hinged connection between the guide rod 159 and the reinforcing plate 138a, and the direction of the force exerted by the spring, which is determined by the guide rod, are such that the weight of the pick-up unit W will just overcome the biasing action of the spring 157 when the pick-up is in the operating position. The spring 157 acts upon the pick-up unit W through a lever arm whose length is determined by the angular position of the hinge pin 160 relative to the hinge pin 137. When the axis of rod 159 and the pins 137 and 160 are all disposed along a straight line, there is no lever arm and no lifting force is applied to the pick-up unit. When the pick-up unit is raised to a position which causes pins 137 and 160 to fall upon a line which is perpendicular to the rod 159, a lever arm of maximum length results. As the pick-up is raised towards the transport position, the effective length of the lever arm between the hinge pins 137 and 160 is increased. The reaction of the spring 157 is decreased by its becoming extended and the biasing force of the combined lever arm and spring remains substantially constant. The pick-up unit W will then remain in either the lowered or operative position or in the raised or transport position when the spring 157 is properly adjusted.

Hold-down strips 163 are provided for holding the pick-up crop material in contact with the stripper plates 149, and a pair of suitable flared end members 165 direct the crop material which is picked up by the tines 147 to the feeding unit F. The construction and positioning of the hold-down strips 163 constitute another novel feature of the structure and are illustrated particularly in Figs. 9, 10, and 11. The hold-down strips 163 are attached to a transversely extending tube or rod member 166 each end of which is journalled into a forwardly extending member 167 attached to each of the flared end members 165. Each of the forwardly extending members 167 is provided with a plurality of spaced-apart bearing holes 169 so that the position of the hold-down strips 163 can be adjusted for varying crop conditions. The hold-down strips 163 are suitably curved and are rigidly attached to the transversely extending rod 166 in a spaced-apart relationship across the pick up. A positioning bracket 171 is attached to one end of the transversely extending rod 166 so as to determine a lowered and a raised position for the hold-down strips. The bracket 171 includes a rectangular plate portion 173 which is attached to the rod 166 in a position parallel to the forwardly extending member 167 and a bent over flat surfaced tab or ear portion 175. The flat surface of the tab 175 engages the lower edge of the forwardly extending member 167 so as to determine the lowered position of the hold-down strips (Fig. 10). In this position, the hold-down strips 163 are maintained a few inches above the stripper plates 149 (Fig. 9). The rearward edge of the tab 175 is cut away so that it permits the hold-down strips 163 to be moved to the vertical position (Fig. 11) before it engages the lower edge of the forwardly extending member 167 and prevents further movement. In the raised position the hold-down strips serve to protect the operator from becoming entangled with the rotating tines if it becomes necessary to clear the material from the machine during operation.

It has been determined that hold-down strips as described above, which are not resiliently biased toward the stripper plates, as in the prior structures, substantially eliminate stoppages of the equipment due to clogging, and result in more even feeding under extremely light loads. The construction of the hold-down strips 163 is such that they serve the dual purpose of holding material against the stripper plates and, at the same time, of protecting the operator from coming in contact with the rotatable tines. In addition, when the machine is used as a stationary baler, the hold-down strips may be raised to form a baffle which causes all of the material pitched into the machine to be fed into the baler.

Preferably the pick-up unit is driven from a connection to one of the drive wheels of the implement. This connection may include a serrated power take off pulley or roller 177 (Fig. 2) which is adapted to be engaged against the inner tire 131 of the drive wheel 33 by means of a rod 179 which extends forwardly to a point adjacent the operator's position. The serrated pulley 177 is keyed to a shaft 181 which is suitably journalled into an adjustably positionable bearing 183 attached to the frame F. A sprocket 185 is keyed to the other end of the shaft 181, and this sprocket 185 is operatively attached to a sprocket 187 on a cross shaft 189 by means of a suitable drive chain 191. The cross shaft 189 is journalled at one end in the frame of the implement, and at the other end into the frame of the pick-up unit, and is connected to the pick-up by means which includes a longitudinally extensible shaft section, a pair of universal joints 193, which permit the pick-up unit W to move relative to the main frame of the implement, a sprocket 195, and a chain 196 which operatively joins the sprocket 195 with a sprocket 197 keyed to the end of the pick-up cylinder shaft 141. The connection between the pick-up cylinder and the ground wheel insures that the peripheral speed of the pick up cylinder will at all times be proportional to the ground speed of the implement. Thus, the tines will move at a speed in a predetermined relation to the ground speed of the implement and will efficiently pick up windrowed material at all speeds of the implement.

If it is desired to drive the pick up cylinder at a speed proportional to the ground speed of the implement without employing a friction drive such as the serrated pulley 177, a direct connection can be made between shaft 189 and the shaft 121 which is one of the drive elements for the implement. In this connection, it should be noted that shafts 121 and 189 turn in opposite directions and that a reversing means must be used, as for example, a crossed belt and two pulleys.

*Feeding unit*

The feeding unit G, shown especially in Figs. 8, 12, 13, 14, and 15 in the drawings, is adapted to deliver the crop material from the windrow pick-up unit W into the baling chamber B. The feeding unit G comprises an auger 199 which is disposed transversely to the line of draft of the implement and a pair of vertically disposed, transversely extending, converging feed belts 201 and 203 which are adapted to deliver the material into the baling chamber B in a precompressed, vertical ribbon. The feeding mechanism is supported on the outrigger-like frame 31 within a suitable housing 205. The housing 205 includes a bottom member 207, an end member 209 which seals off the outer end of the feeding mechanism, a back member 211 which is hingedly supported at its bottom edge by a pair of hinges 212 (Figs. 17 and 17a) so that it can be lowered to form a rearwardly extending, downwardly inclined, platform, and a top member 213. An opening is provided in the forward side of the housing 205, this opening having the same length as the width of the pick-up unit W, in order that all material which is gathered up by the pick-up unit W will be conveniently moved into the feeding unit G. The housing 205 also includes suitable cover plates 214 which are adapted to protectively surround all of the moving elements of the feeding unit G.

The auger 199 includes a central core 215 which is provided with a journal portion 217 of reduced size, at each end (Fig. 17). A spirally formed member 219 is welded or otherwise fastened to the cylindrical core 215 to define the flight of the auger, and the direction of rotation of the auger is such that the material collected by the pick-up is delivered into the nip formed by the feeding belts 201 and 203. The auger flight 219 may be formed from one piece of metal or, more conveniently, may be fabricated from a series of short segments which are welded together to form the complete spiral. The journal section portion 217 at the outer end of the auger 199 is rotatably supported in a suitable bearing 222 in the end member 209 of the housing 205, and the journal portion 217 at the inner end of the auger 199 is journalled in a bearing which is supported upon a bracket 221 attached to a member of the housing 205 (Fig. 12).

A stripper bar 223, which is proportioned to co-act with the auger 199, is supported in the housing 205 at a point adjacent the juncture between the back member 211 and the top member 213. The stripper bar 223 co-acts with the auger 199 in the usual manner, and causes crop material to move inwardly towards the feed belts 201 and 203 instead of traveling around the auger 199.

The pair of transversely extending, vertically disposed, converging feed belts 201 and 203 extend from the delivery end of the auger 199 to a point adjacent an inlet opening 225 into the baling chamber B (Figs. 13 and 14). The inner or co-acting runs of the feed belts 201 and 203 form a receiving nip adjacent the delivery end of the auger 199 and then converge as they approach the opening 225 in the baling chamber, so that crop materials being baled are compressed into a thin, vertically extending ribbon. Compression, or precompression, of the material being baled is increased in the embodiment of the invention illustrated, by resiliently biasing the forward feed belt 201 against the rearward feed belt 203 as will hereinafter be described.

Each of the feed belts 201 and 203 comprises a plurality of continuous strips of flat belting 227 and 227a, respectively (Fig. 14) which are suitably supported on vertically extending rollers 201a, 201b, and 201c, and 203a, 203b, 203c, and 203d. The face of each of the rollers is provided with spaced-apart ridges 229 which are adapted to guide the individual strips of belting 227 and to maintain them in a predetermined position.

The rollers 203a, 203b, 203c, and 203d for the rear feed belt 203 are rotatably journalled into a sub-frame 231 which includes an upper plate 233, a lower plate 235, and vertically extending strengthening and spacing members 237. The guide rollers 203a and 203b, which support the inner faces of belt sections 227a, are rotatably journalled adjacent the forward edge of the subframe 231, at its inner and outer ends respectively. The guide roller 203a which is disposed adjacent the inlet 225 to the baling chamber, should be of small diameter so that the crop materials are thrown into the baling chamber instead of following the belts 227a around the roller 203a, as would be the case if a larger diameter roller were used. The driving roller 203d is of relatively large diameter and is positioned to the rear of the inner run of the belt 227a, in a position intermediate the guide rollers 203a and 203b. The driving roller 203d is supported upon a vertically extending shaft 239 which is long enough to extend through both the bottom 207 and the top 213 of the feeding unit housing 205. The proper belt wrap for the drive roller 203d is obtained by providing a take up roller, indicated at 203c, to the rear of the driving roller 203d. The take up roller 203c is journalled into a frame 240 which is slidably supported in transversely extending slots 241 in the upper and lower plates 233 and 235 respectively, and is made adjustable in a transverse direction by means of a pair of threaded, adjusting rods 243 which extend through suitably spaced holes in the vertical frame member 237. Accurate adjustment is made possible by threaded hand knobs 245 which engage the threaded adjusting rods 243.

The sub-frame 231 for the rearward feed belt 203 is held in a fixed position relative to the feeding unit mechanism by means of a novel spring latch arrangement 247 which is illustrated, particularly, in Fig. 14. The spring latch arrangement 247 includes a vertically extending spacer rod 248 which is attached at its ends to the upper and lower plates 233 and 235 of the sub-frame 231. The connection between the vertically extending spacer rod 248 and the plates 233 and 235 may include a pair of L-shaped castings 250 and 250a which serve to reinforce the connections. A pair of outwardly extending cantilever members 252 and 252a are attached to the vertically extending spacer rod 248 in positions which are spaced from each of the L-shaped castings 250 and 250a. Coaxial holes, which are adapted to receive a pair of latching pins 254 and 254a, are drilled through the cantilever members 252 and 252a, the L-shaped castings 250 and 250a, the plates 233 and 235, and the top and bottom members 207 and 213 of the feeding unit housing. The holes are positioned so that when they are aligned the sub-frame 231 and the associated feed belt 203 are in the proper position, relative to the feed belt 201, to insure effective precompression of the crop materials being baled.

The latching pins or slide bolts 254 and 254a extend through the drilled holes in the top and bottom members 213 and 207 respectively of the feed unit housing. The pins 254 and 254a are biased into engagement with the top and bottom members of the feed unit housing by means of coiled springs 256 which act against a washer 258 or other projection which is attached to the shank of each of the sliding bolts or pins 254 and 254a. Bell crank levers 260 and 260a are pivotally connected to the outwardly extending cantilever members 252 and 252a, respectively. Each of the bell crank levers 260 and 260a is positioned so that one of its arms extends generally vertically along the spacing member and the other of its arms engages the free end of the bolt or locking pin adjacent the cantilever members.

When the arms of the bell crank levers and the spacer rod are squeezed together by hand, the biasing action of the springs 256 is overcome and the latching bolts or pins 254 and 254a are retracted from the holes in the upper and lower covers 213 and 207 respectively. The inner end of the feed belt sub-frame 231 and its associated rollers and belts then may be swung rearwardly about the drive roll shaft 239. This construction facilitates access to the baling chamber opening 225 for maintenance or repair of the baling plunger.

The forward feed belt 201 also includes a subframe 251, three sections of flat belting 227, and the supporting rollers 201a, 201b, and 201c for the belt sections. These rollers are provided with the ridges 229 for guiding and positioning the belt sections and are supported by suitable bearings on the sub-frame 251 (Figs. 12 and 14). The drive roller 201b for the forward feed belt is positioned at the outer end of the sub-frame 251. The drive roller 201b is supported upon an elongated shaft 249 which is adapted to extend through the top 213 and the bottom 207 of the feed unit housing 205; the inner end of the feed belt is provided with a guide roller 201a of a suitable small diameter, similar to the roller 203a. The sub-frame 251 includes top and bottom plate members 253 and 255, and a vertical, spacing and strengthening member 257. The take up roller 201c is supported in a separate, U-shaped frame 259 which is slidably supported in slots 261 in the upper and lower plates 253 and 255, the slots 261 extending transversely to the line of movement of the inner face of the forward feed belt. Adjusting rods 263 are provided which extend through the fixed vertical frame member 257, and these co-act with threaded knobs 265 similar to the knobs 245 used to adjust the tension in the rearward feed belt.

The forward feed belt 201 is biased to the position shown in Figs. 12, 13, and 14 by a spring 269, and adapted to swing about the drive roll shaft 249 toward and away from the other feed belt 203. At the inner end of the sub-frame 251 there is a vertically extending, curved, metal plate 267 which co-acts with the outer surface of the baling chamber B to prevent the loss of crop materials when the forward belt 201 moves from the Fig. 12 position. The biasing spring 269 acts between the vertical spacer 257 and a bracket 271 which is fixedly attached to the feed unit housing 205.

The feeding unit G is power driven from the baler mechanism by means of a conventional flat drive belt 273 (Figs. 8 and 15). The upper end of the shaft 239 for the rear feed belt drive roll 203d is provided with a pulley 275 which is engaged by the flat drive belt 273, and suitable idler pulleys 277 and 279 (Fig. 15) are journalled on vertically extending stub shafts 281 and 283 which are attached to the top member 213 of the feed unit housing 205. The pulley 275 is the main drive pulley. As the drive belt 273 extends from the driving mechanism in a horizontal plane and since the idlers 277 and 279 and the pulley 275 on the rear feed belt drive shaft 239 extend vertically, suitable means are required for turning the belt on edge in order that it may engage the main drive pulley 275. This means will be described in the section entitled "Power Drive Connections."

A pulley 285 is keyed to the lower end of the rear feed belt drive shaft 239 and this is operatively connected to a pulley 287 on the lower end of the forward feed belt drive shaft 249 by means of a suitable V-belt 289. A spring biased belt tightener 291 is provided on the run of belt 289 to insure a positive drive connection. The belt tightener 291 includes a bell crank lever 293, one arm of which is pivotally attached to the bottom member 207 of the feed unit housing 205 by means of a pin 295, and the other arm of which supports a belt tightener pulley 297. A spring 299 extends from the juncture of the two arms of the bell crank lever 293 to a fixed point on the feed unit housing 205 in order to provide the proper tension for the belt 289.

The auger 199 is driven, by means of a V-belt 303, from a pulley 301 keyed to the upper end of the forward feed belt drive shaft 249. The V-belt 303 connects the pulley 301 with a pulley 305 keyed to the outer journal section 217 of the auger 199 and the connection includes a suitable reversing pulley 307 and a belt tightener pulley 309. The V-belt extends from the pulley 301 on the forward feed belt drive shaft 249 around the belt tightener pulley 309 which engages the back, or flat side of the V-belt 303. The belt tightener pulley 309 is of the same type as the belt tightened pulley 297 which has been described in connection with the belt 289, and includes a bell crank lever 311 and a biasing spring 313. The inner, or V, surface of the belt 303 then passes around the fixed reversing pulley 307 which is journalled on a vertically extending shaft 315 attached in the top member 213 of the feed unit housing 205. The belt 303 then runs over an idler pulley 317 which is supported on a longitudinally extending, horizontally disposed shaft 319, around the drive pulley 305 on the journal section 217, upwardly around an idler pulley 321 which is supported on a longitudinally extending, horizontally disposed shaft 323 and back to the pulley 301.

Under some operating conditions, it is desirable to provide a fixed backing plate (not shown) to reinforce the inner runs of the feed belts 201 and 203 which engage the crop materials. The backing plate should be suitably shaped so as to prevent undue wear on the belt and in some instances can be resiliently biased against the run of its associated belt. A backing plate insures a more positive pressure on the material being baled and results in even more effective precompression.

Under some operating conditions a single feed belt may be used to compress the material being baled instead of the three belt sections 227 described above, but it has been found that for the most efficient precompression a multiplicity of belt sections 227 have an advantage in that they can be held at a greater tension without causing the belts to run out of line.

In the foregoing, there has been described a novel feeding unit for a baler which is adapted to deliver the material being baled into the baling chamber in a precompressed, vertically extending ribbon. The feeding of the material into a baler in this form causes the bales to have flat sides and square corners, and to be of a uniform density through its length and its cross sectional area. Under conditions of extremely light feeding, the feed belts which are resiliently biased together cause the material to be evenly distributed vertically across the baling chamber and thus prevent the density variations which are usually noted when ordinary feeding arrangements are used.

*Baling chamber*

The baling chamber B is supported upon the longitudinally extending portion of the frame of the prime mover in a position adjacent the discharge end of the feed belts 201 and 203 (Fig. 13). The baling chamber B is fabricated from suitable plate members 325 (Fig. 18) which are welded or otherwise fastened together to form the top, the bottom, and the sides of the rectangularly shaped chamber. The rectangular opening 225 into the baling chamber is located adjacent the outlet end of the feed belts 201 and 203, and the material being baled is fed into the chamber through this opening. A plurality of vent holes 327 are provided in the bottom surface of the baling chamber B so that the pressure of air within the chamber remains normal during the baling operation (Fig. 18).

Figure 25:
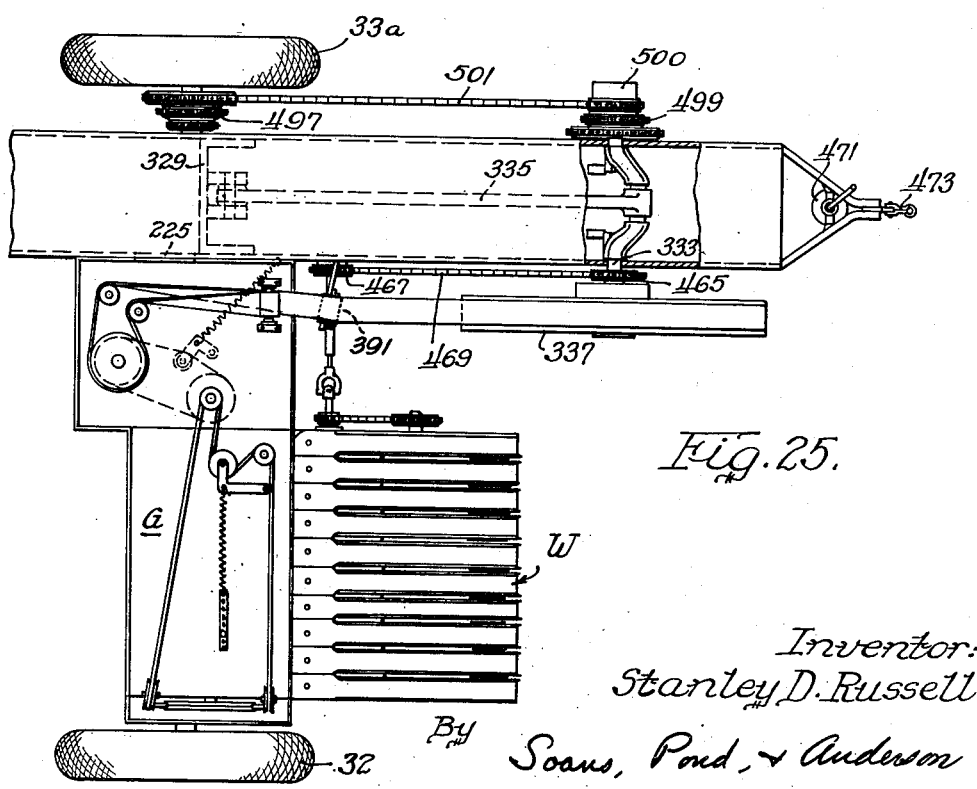
Fig. 25 is a diagrammatic, plan view of the drive mechanism which is employed when a baler in accordance with the invention is driven from a ground wheel.

A baling plunger or piston 329, having a rectangular cross section, is slidably supported within the baling chamber B. The proportions of the piston are such that it fits closely within the baling chamber thereby assuring that the crop materials will be efficiently compressed. The piston 329 is reciprocated by means of a crank shaft 333 which is rotatably journalled in suitable bearings at the forward end of the baling chamber B (Figs. 3 and 25). The connection between the crank shaft 333 and the piston 329 is conveniently made by a conventional connecting rod 335. The crank shaft 333 is horizontally disposed and extends transversely of the baling chamber. One end of the crank shaft projects out of the baling chamber, and a large cast iron or fabricated fly wheel 337 is attached thereto. It is possible to reciprocate the baling piston 329 in various ways, as for example by the use of a cam keyed to a cross shaft, the cam operating against a spring biased push rod which is connected to the baling piston 329. Under some circumstances a variable speed stroke, such as would be obtained by the action of a cam, may be desirable. For example, the compression stroke can be slowed down with a corresponding increase in the speed of the return stroke. Also the piston can be caused to pause momentarily at the beginning of the power stroke, thereby keeping the feed opening unobstructed for a greater period of time during each stroke despite the use of a slow compression stroke.

A shearing blade 339 is attached to the side of the piston which is adjacent the intake or feeding opening 225 by means of a plurality of cap screws 341 (Fig. 18). The shearing blade 339 cooperates with a fixed shear plate 343 which is attached to the rearward edge of the intake opening 225 (Fig. 13). On each stroke of the baling piston 329, the crop material being baled is cut off by the shear blade 339 as the crop is compressed so that the baled material forms a plurality of individually separable, compressed layers.

In order to prevent the baled material from re-expanding to its original volume, a plurality of inclined wedges 345 are attached to the walls 325 of the baling chamber. The wedges 345 are relatively narrow (in a commercial embodiment of the invention having a bale case which has cross sectional dimensions of approximately 16 inches by 20 inches, the wedges are only about ⅝ inch wide and extend outwardly from the walls about ⅝ inch, two wedges being provided on the top, the bottom, and on each of the sides) and they are positioned so as to present a flat surface to the already baled material, thus preventing its re-expansion (Fig. 18). The inclined or wedge surface is presented to the material which is being compressed by the piston 329. A plurality of recesses 347 are provided in the baling piston 329 to permit the face of the piston to move rearwardly past the wedges 345. This insures that the material being baled is forced past the wedges on each stroke of the piston.

A particularly successful replaceable wedge construction is shown in Figs. 19 and 20. The illustrated wedge 345 includes a wedge portion 346 which has one surface 348 approximately perpendicular to the wall 325 of the bale case and another surface 350 which is inclined toward the wall 325. The other two surfaces 352 of the wedge portion are in the shape of a right triangle and lie in parallel planes which are substantially perpendicular to the walls 325. An irregular shaped boss 354, which may be in the shape of a rectangular prism, as illustrated, is integrally attached to the bottom of the wedge portion 346. The rectangular prism 354 has a cross sectional area which is less than the cross sectional area of the wedge portion 346. The prism portion is provided with a suitably drilled and tapped hole 356. When attaching the wedge 345 to the wall 325 of the baling chamber, a rectangular or square aperture which will receive the rectangular prism section 354 is provided in the wall 325. The prism portion is placed in the aperture, and is locked in place by means of a machine screw 358 and an enlarged washer 360, as illustrated in Fig. 20.

A wedge, as above described, may be easily replaced when it becomes worn and is not subject to the failures of the usual spring biased dogs which are used in the conventional baler. The natural resiliency of the material being baled is utilized in forcing the material into engagement with the wedges, and the narrow width of the wedges reduces the amount of damage to leaves and stalks and thus effectively prevents "dusting."

The improved feeding unit G of the invention, which provides a precompressed ribbon of crop materials, makes possible a substantial reduction in the length of the stroke of the piston, together with an increase in the number of working strokes per minute, as compared with the known prior arrangements. In the embodiment of the invention illustrated, the stroke of the piston is about 8 inches, and the piston is reciprocated so that it has about 200 working strokes per minute. Prior apparatus of similar capacity operated at piston speeds of the order of 30 to 45 working strokes per minute and with a length of stroke of the order of 3 feet. It is desirable that the speed of the piston be correlated with the speed of the feed belts 201 and 203 so that the inlet opening 225 to the baling chamber will remain open for a sufficient time to allow an even layer of material to be deposited in the baling chamber prior to each compression stroke of the piston.

In balers constructed in accordance with the invention it has been found that a ribbon of precompressed crop material having a length of about one and one-half times the width of the baling chamber should be fed into the chamber on each stroke of the piston. When the speeds of the feed belts are so correlated to the rate of the working strokes of the baling piston, the crop materials being baled are formed into flat sections within the bale which have parallel sides which may be easily detached from one another to facilitate the use of the baled material. The above ratio has been found to be substantially an optimum ratio for baling various different crop materials, as for example, hay, straw, alfalfa, and clover. However, when the baler is to be used for baling straw, for example, for long periods of time, it may be desirable to adjust the speed ratio between the feed belts and the piston speed by varying the size of the drive pulley 275.

In a particular commercial embodiment of the invention which has a baling case 18 inches high and 14 inches wide, and a piston stroke of 8 inches, it has been found desirable to feed about 22 linear inches of the precompressed ribbon of crop materials into the chamber for each stroke of the piston. Observations made during the operation of this embodiment show that the pick-up crop material leaving the auger and entering the receiving nip of the feeding belts extends substantially the entire height of the feeding belts and is from 12 to 15 inches in thickness. After precompression by the resiliently biased feed belts, the thickness of the material is reduced to about from 1 to 6 inches, the precompressed material thus occupies from about $\frac{1}{12}$ to $\frac{1}{3}$ of its original volume. Correlation between the linear speed of the feeding belts and the rate of travel of the piston is extremely important if all types of crop materials are to be efficiently baled.

The construction of the invention makes possible economy of manufacture and of operation, because expensive reduction gears, massive fly wheels, and the like are eliminated, and the overall cost of the implement may be reduced. The high speed piston permits the fly wheel, which also serves as the drive pulley, to be mounted directly on the crank shaft, and in addition it becomes possible to use a smaller fly wheel. The high speed operation of the crank and fly wheel has the further important advantage that it loads the driving engine or other drive mechanism much more evenly than the slower speed prior machines. The combination of the long slow piston stroke of the prior art machines together with the horizontal feed openings, caused the crop materials being baled to become more dense at the bottom of the chamber than at the top, as contrasted with the short stroke and vertical feed opening combination of the present invention which produces thin even layers of material with accompanying uniform density throughout the height of the bales.

Bale case

The overall density of the baled material is determined by the resistance of the material which has been previously compressed to the baling piston. This resistance in turn is determined by the relative dimensions of the bale case, and in most balers there is provision made for adjusting these dimensions to permit the handling of different crop materials.

The bale case C is located longitudinally adjacent to the rear of the baling chamber B and is shown particularly in Figs. 1, 2, 22, and 23. The bale case C, is, in general, a guideway for the baled material, which is of adjustable cross sectional area, and includes a top and a bottom member, 349 and 351 respectively, which are spaced apart at their rearward ends by means of a vertically extending yoke 353 which permits a predetermined amount of vertical movement therebetween. The bottom member 351 of the bale case C is formed from a longitudinally extending plate which is supported upon the angle members 37 of the main frame F. The top member 349 of the bale case is a channel member which is positioned with its two reinforcing webs extending downwardly. The angle between the webs and the connecting section of the channel causes the upper corners of the baled material to have sharp edges.

Figure 22:
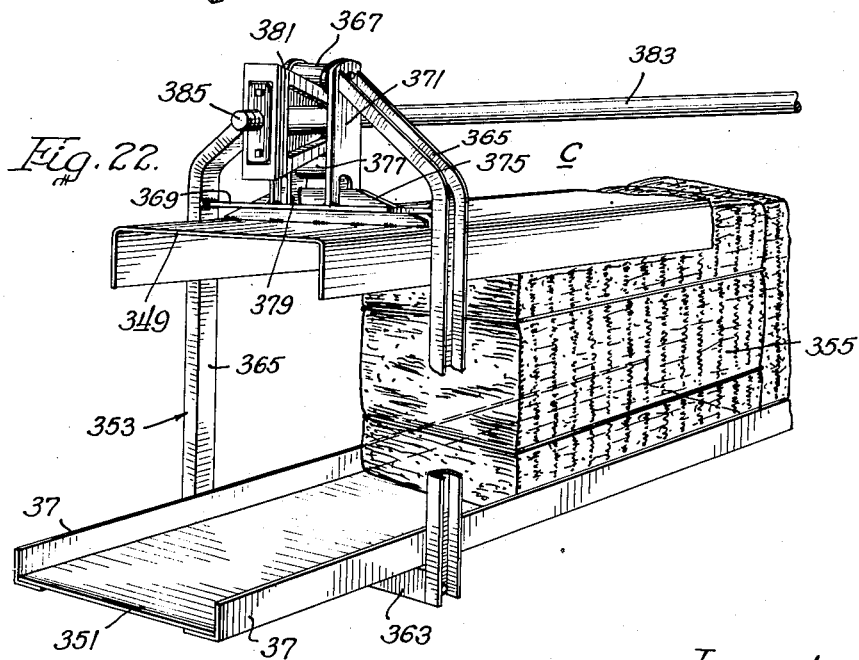
Fig. 22 is an enlarged fragmentary, perspective view of a novel adjustable bale case which is embodied in the apparatus of the present invention illustrated in Fig. 1.

In the embodiment of the invention illustrated, adjustment of the density in the baled material, indicated at 355 in Fig. 22, is accomplished by reducing the vertical spacing between the top and bottom members 349 and 351. The change in spacing is effected by movement of the top member 349 which is hinged to permit its movement relative to the lower member so as to provide an added resistance to the movement of the already baled material through the bale case. The top of the bale case may be hinged to the upper member of the bale chamber in any convenient manner, but it has been found that sufficient hinge action may be obtained by welding or otherwise attaching a piece of angle iron 357 to the end of the top member 349 of the bale case C and a similar piece of angle iron 359 to the top of the baling chamber. The pieces of angle iron 357 and 359 are loosely fastened together by means of bolts or rivets 361 (Figs. 1 and 2). This type of yielding connection has been found to permit the required relative movement.

Figure 23:
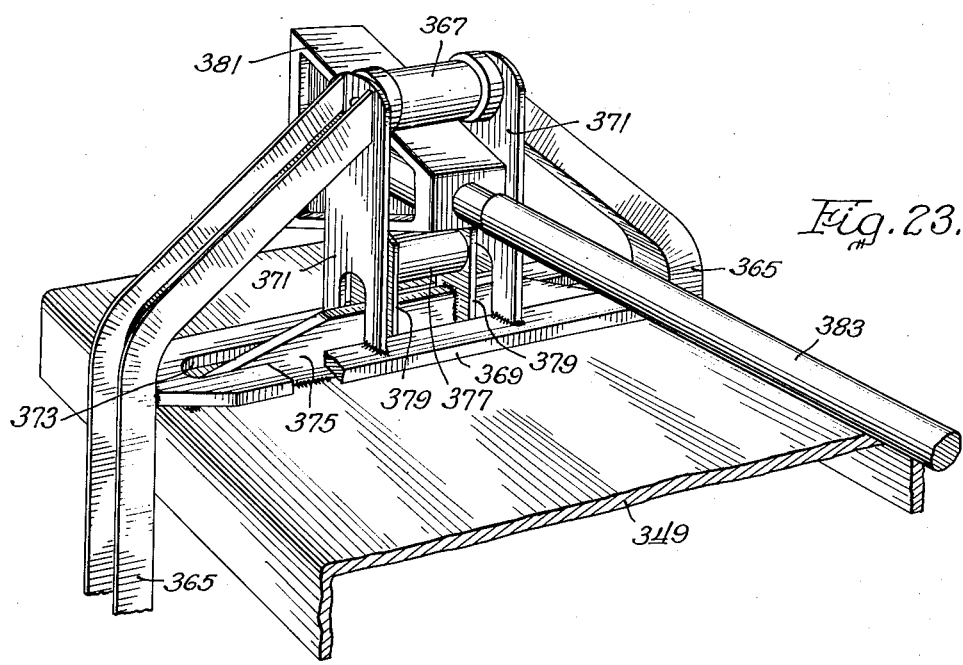
Fig. 23 is an enlarged fragmentary, perspective view of the adjusting wedge which forms a part of the bale case illustrated in Fig. 22.

The vertically extending yoke 353, which determines the position of the top member 349 of the bale case C includes a horizontally disposed member 363, attached to the lower side of the bottom member 351 of the bale case. A vertically extending member 365 is attached to each end of the horizontal member 363 and upper portions of the vertical members 365 taper inwardly around the top member 349 of the bale case C so as to support a roller 367. A horizontally disposed reinforcing member 369 is attached across the vertically extending members 365 of the yoke 353, and a pair of vertically extending reinforcing members 371 extend from adjacent the ends of the roller 367 to the horizontal reinforcing member 369. The horizontal reinforcing member 369 is fabricated with a transversely extending cut-out portion 373 which is adapted to receive a transversely extending web portion 375 attached to the upper member 349 of the bale case C. A second roller 377 is supported in a transversely extending direction above the top of the bale case by means of a pair of supporting brackets 379 attached to the web 375 (Fig. 23).

A wedge member 381 is inserted between the pair of rollers 367 and 377 so as to effect a downward force upon the lower 377, so as to move the top member 349 of the bale case C towards the bottom member 351 of the bale case C. The constriction of the outlet opening of the bale case thus effected, causes a greater pressure in the baling chamber B because of the added resistance to the movement of the bales and the compressed material.

Adjustment of the wedge 381 is made possible by means of a longitudinally extending control rod 383 which has a threaded end portion 385 which is adapted to engage a threaded portion (not shown) within the wedge 381. The control rod 383 extends forwardly to a position adjacent the baler operator where a hand crank 387 is provided to effect accurate adjustment of the wedge 381. The forward end of the control rod 383 is rotatably journalled within a bracket 389 attached to the top of the baling chamber B (Figs. 1 and 2). It is desirable that the cooperating threads in the adjusting wedge 381 and the threads 385 on the control rod 383 have a fine pitch, so that extremely accurate adjustments may be made in the bale case opening.

The bales may be fastened together by baling wires or the like. If baling wires are used they may be inserted about the bales either manually or by automatic baling mechanisms. In the illustrated embodiments of the invention, the bale tying or fastening means is indicated by the reference letter "T."

The novel bale case, which has been described in the foregoing, is capable of forming bales which have sharp corners and straight, flat sides, so that the handling and the storage of the baled material is facilitated. The hinged bale case and the novel wedge adjustment permit accurate control of the density of the compressed material and enable the operator of the baler to easily and rapidly change the density of the bales as the condition of the material being baled changes in the field.

*Power drive connection*

The general constructional features and the drive mechanisms of the improved baler of the invention have been described in the foregoing sections. As previously noted, all of the power driven elements of the baler are driven from the main drive belt 273 (Fig. 3) which engages the drive pulley 41, keyed to the end of the cross shaft 43. As described in connection with the prime mover P, the cross shaft 43 is operatively connected to the engine M of the prime mover P so that it rotates at a predetermined constant speed. The main drive belt 273 extends around the flywheel 337 and around the vertically extending idler pulleys 277 and 279 and the feed belt drive pulley 275 on the feeding unit G.

The main drive belt 273 is maintained in proper alignment on the various pulleys by means of a novel eccentric adjusting pulley 391 which is illustrated in particular detail in Figs. 12 and 16 in the drawings. The adjusting pulley 391 is supported from the frame 205 of the feeding unit G by means of a pair of brackets 393 and 395, and is located so as to engage the lower side of the main drive belt 273 on the run which returns from the feeding unit G to the flywheel 337 (Fig. 12). The eccentric adjusting pulley 391 includes a conventional cylindrical pulley roller 397 which is rotatively supported on ball bearing rings 399 that are held in place in a suitable manner on a conventional pulley gudgeon 401. The gudgeon 401 is supported upon a pair of spindles 403 and 405 which are co-axial but which are eccentric in relation to the axis of the gudgeon 401. The axis of the spindles conveniently lies on a line 407 which bisects a line 409 lying along the axis of the gudgeon 401 which supports the pulley roller 397. The angle between the axis of the gudgeon 409 and the axis of the spindles 407 is about 5 degrees (indicated at α in Fig. 16). In order to permit the adjustment of the pulley 391, the outer end of the spindle 405 is flattened to form a portion which may be gripped by an adjusting wrench.

The spindles 403 and 405 are supported in brackets 393 and 395, and the bracket 395 is provided with a split portion 411 (Fig. 12) which may be clamped around the end of the spindle 405 which is associated with that bracket, in order to permit adjustment of the pulley 391. The split portion 411 is provided with a clamping screw 413 whereby the pulley spindle 405 may be locked in place. During operation of the drive belt 273, the gudgeon 401, which is eccentric to the axis of the supporting spindles 403 and 405, is adjusted while the belt 273 is in motion by means of an adjusting wrench which engages the flattened spindle 405. Accurate adjustment of the belt is accomplished by turning the spindle 405 until the belt 273 runs true on all of the pulleys in the series. When the proper position of the gudgeon 401 and its associated pulley 397 is determined, the spindle 405 is locked in position by means of the machine screw 413. An eccentric pulley, in accordance with the invention, may be easily adjusted by the operator while the machine is running, as this assures the accurate alignment of the belt on the first adjustment, instead of requiring the usual trial and error adjustments that are common with prior devices of this character. It is, of course, obvious that the operator must use care in order that his clothing does not become entangled in the moving belt. If it is desired to adjust the pulley from a position remote from the belt 273, a suitable extension rod may be attached to the spindle 405 so that the operator will be able to adjust the belt alignment with a minimum of danger.

A cooperating pulley 415 (Fig. 15) is supported on the feeding unit frame 205 above the adjusting pulley 391 so as to guide the drive belt 273 while it is being turned on edge to engage the idler pulley 279 and the feed belt drive pulley 275. It has been found that only one adjusting pulley, of the type disclosed, is necessary to maintain the drive belt 273 in accurate alignment.

Proper tension is maintained on the drive belt 273 at all times by means of a spring biased belt-tightener pulley 417 (Fig. 7). The belt-tightener pulley 417 rotates upon a shaft 419 which is attached in one of a series of spaced apart holes 421 in an adjusting quadrant 423. The quadrant is hingedly supported upon the main frame of the implement, intermediate the flywheel 337 and the driving pulley 47 on the cross shaft 43. An adjusting lever 425 is attached to the quadrant, and this lever extends upwardly to a position adjacent the baler operator.

A biasing spring 427 is connected between the adjusting lever 425 and a point on the main frame so that a constant pressure is maintained on the drive belt 273 at all times. When it is desired to release the tension on the belt 273 and to rapidly disconnect the driven elements from the driving pulley 47, the operator pulls the adjusting lever 425 and this effectively removes all of the driving power. A movable pulley, such as has been described, is also convenient when it is desired to remove the driving belt 273 from the implement, as for example in rainy weather when the belt might stretch. When belts of slightly different lengths are used or when it is desired to effect substantial changes in the tension on the belt, the pulley shaft is placed in the appropriate hole 421 on the quadrant 423.

The flywheel 337, which provides the necessary inertia to carry the baling piston 329 through each stroke, is rotatively supported upon a sleeve 429 attached to one end of the baling piston crank shaft 333 and is adapted to rotate relative to the sleeve 429 on which it is journalled (Figs. 21 and 21a). In this connection, the sleeve 429 is keyed to a tapering portion 430 at the end of the shaft 333 and is held in place longitudinally on the shaft by a nut 431 which engages a retaining washer 433. The retaining washer 433 also positions the flywheel 337 longitudinally on the sleeve 429. An annular oil groove 435 is provided on the inner surface of the hub 437 of the flywheel 337 and an oil passageway 439 connects the oil groove with the outer surface of the hub 437 thereby permitting lubrication of the co-acting surfaces of the sleeve 429 and the hub of the flywheel. A grease fitting 441 is conveniently provided at the outlet of the passageway 439.

The flywheel 337 is operatively connected to the crank shaft 333 by means of a radially extending arm 443 (Figs. 21 and 21a) which is attached at one end to a boss 445 on the flywheel hub 437 and at the other end to the sleeve 429 which is keyed to the crank shaft 333. The connection between the arm 443 and the boss 445 on the flywheel hub 437 is effected by a bolt 447 which connects an opening 449 in the boss 445 with a cooperating opening 451 in the arm 443. The bolt 447 is proportioned so that it will shear when the piston 329 meets an incompressible object or when the baler is overloaded. The size of the bolt 447 which is necessary to provide the proper safety factor is also affected by its position relative to the center of the flywheel 337.

*Operation*

The self-propelled baler which has been described in the foregoing can be easily and economically operated, and the construction of the implement permits the baling of a maximum amount of hay even under adverse conditions. When baling hay with the prior art balers, it is difficult to efficiently utilize the implement. Not only is it necessary to delay the baling of the hay until a proper cure has been reached, but also it is necessary each day for the operator to wait until the dew has evaporated from the curing windrows. Sometimes several hours elapse in the morning before it is possible to start baling and this results in wasted labor and the inefficient utilization of the implement. With a baler in accordance with the invention, it is possible to use the implement throughout the working day. When the hay is too green or damp from dew, curing and drying of the hay can be greatly speeded up by using the implement as a windrow mover.

When converting the implement to a windrow mover, the hinged back plate 211 on the feeding unit G is lowered to a downwardly inclined position so as to form a rearwardly extending platform (Fig. 17a). A supporting strap 461 may be provided to maintain the back plate 211 in position, and this strap is desirably provided with a series of holes 462 to permit adjustment of the back plate 211. A vertically extending baffle plate 463 (Figs. 17 and 17a) is disposed across the feeding unit housing 205 between the auger supporting bracket 221 and the feed belts 201 and 203, to prevent crop materials from being fed into the baling chamber B. When it is desired to move a windrow, the implement is run along the windrow so that the crop material is picked up on the outer portion of the pickup unit W and moved rearwardly to the feed auger 199. The feed auger 199 moves the material transversely of the line of draft of the implement, whereupon it engages the baffle plate 463. The baffle plate 463 causes the crop material to move rearwardly across the platform formed by the rearwardly extending back cover 211 of the housing 205 until it falls to the ground in a windrow which is offset several feet from the original windrow (Fig. 17). The stripper bar 223 prevents the crop material from winding about the auger 199.

In its new or offset position the windrow is fluffed up but it is not turned over. Also it is supported upon new, dry stubble in the field and this permits air to circulate freely through and about the windrow. A windrow which has been moved in the manner which has been described, cures much more uniformly than crop material which is turned over in the moving process, as for example, when a side delivery rake is employed. The turning over of a windrow exposes additional leaves to the bleaching action of the sun and this greatly reduces the nutritional value of the crop. In addition to the bleaching action of the sun, turned over crop material becomes bunched and this bunching in the windrow makes it difficult to obtain uniform feed in a pickup type baler.

When moving windrow in preparation for baling, the operator should judge the length of time that will be required for the crop to become properly dried and then he should move approximately one-half of the material which can be baled in that time. The operator can then retrace his path and begin baling the first moved material.

After the crop is in proper condition for baling, the back plate 211 of feeding unit housing 205 is closed, the baffle plate 463 removed, and the pickup unit W is aligned along the windrow which is to be baled. The baler is moved forward at a speed which is in proportion to the size of the windrow and the capacity of the implement. The accurate speed adjustment made possible by the novel V-belt drive permits the operator to run at substantially optimum ground speeds at all times. As has been previously described, the pickup cylinder 139 rotates in a direction which is opposite to the rotation of the supporting wheels so that the pickup tines 147 lift the windrow along the stripper plates 149 into the feeding unit G. The crop material is held in position against the stripper plates 149 by means of the hold down rods 163 which form a part of the wind guard. As has been described, the rods 163 are not biased against the crop, but only exert sufficient pressure to keep the material in contact with the tines 147. The upturned edges 151 of the stripper plates 149 cooperate with the tines 147 to accomplish clean feeding.

The auger 199, in the feeding unit G, moves the material into the nip formed between the feed belts 203 and 205. The feed belts 201 and 203 precompress the crop material into a thin, vertically extending, ribbon of substantially uniform cross section which is fed into the baling chamber B through the opening 225 provided in the side thereof. The rapidly reciprocating baling piston 329 compresses the crop material on each stroke, and in addition, the shear blade 339 on the piston cooperates with the fixed shear plate 343 to cut off the thin ribbon of precompressed crop materials. The bale that results from such baling action is formed of a plurality of individually separable layers. The compressed crop material is prevented from re-expanding by the set of cooperating wedges 345 and recesses 347 which form a part of the baling chamber B and the baling piston 329, respectively.

The baling pressure is maintained at the desired value by adjustment of the hinged bale case C. The bale case C may be continuously adjusted to the condition of the hay or other crop material by the operator so as to produce bales of the highest quality. Thick hay, as would be found in low, moist sections of a field, requires less baling pressure than the light hay which is found in the higher portions of a field. The adjustment of the bale case C is effected, as previously described, by moving the adjusting crank 387, adjacent the operator's position, a sufficient amount to move the wedge member 381 enough to decrease or increase the clearance between the top member 349 and bottom member 351 of the bale case C.

After the baled material emerges from the baling chamber B the individual bales are tied or otherwise fastened, as by the tying unit T (Figs. 2 and 8). The tying operation is conveniently effected in the forward portion of the bale case C. The baled material is pushed from the rearward end of the bale case C as the bales are formed, and may be permitted to fall upon the ground, or under some conditions it may be desirable to trail a wagon behind the baler so that the bales will be deposited directly upon a transport vehicle.

If it is desired to use the baler for stationary operation, a sprocket 465 attached to the sleeve 429 on the baling piston crank shaft 333 and a second sprocket 467 keyed to the pickup unit drive shaft 189 (Fig. 3) are operatively connected by means of a suitable drive chain 469. When so arranged, the pickup unit is driven by the engine M instead of from the ground wheel 33 as in the mobile unit. The hold down rods 163 on the pickup unit may be raised to a substantially vertical position so that a suitable receptacle for receiving the hay is formed. The hay or other crop material is forked or otherwise fed into the receptacle provided by the pickup unit W and the hold down strips 163 wherein it is acted upon by the rotating pickup tines 147 which move the material to the feed auger 199. The feed auger 199 moves the material to the feed belts 201 and 203 and the baling continues substantially as has been before described in connection with mobile operation.

*Self-powered, pull type baler*

While the implement which has been described in the preceding sections is a self-powered, self-propelled baler, various of the novel features which have been disclosed may also be incorporated in pull type balers. As previously noted, pull type balers constitute self-container units and are adapted to be drawn by a tractor or other draft vehicle. They may be powered from a suitable drive connection to one of their supporting wheels, i. e. they may have a bull wheel drive, or from a power take-off shaft which extends between the tractor and the baler, or from a separate engine which is supported on the frame of the baler. The incorporation of the features of the invention into a pull type baler, regardless of its motive power, results in a lighter implement which has a larger capacity than any of the known pull type implements.

Figure 26:
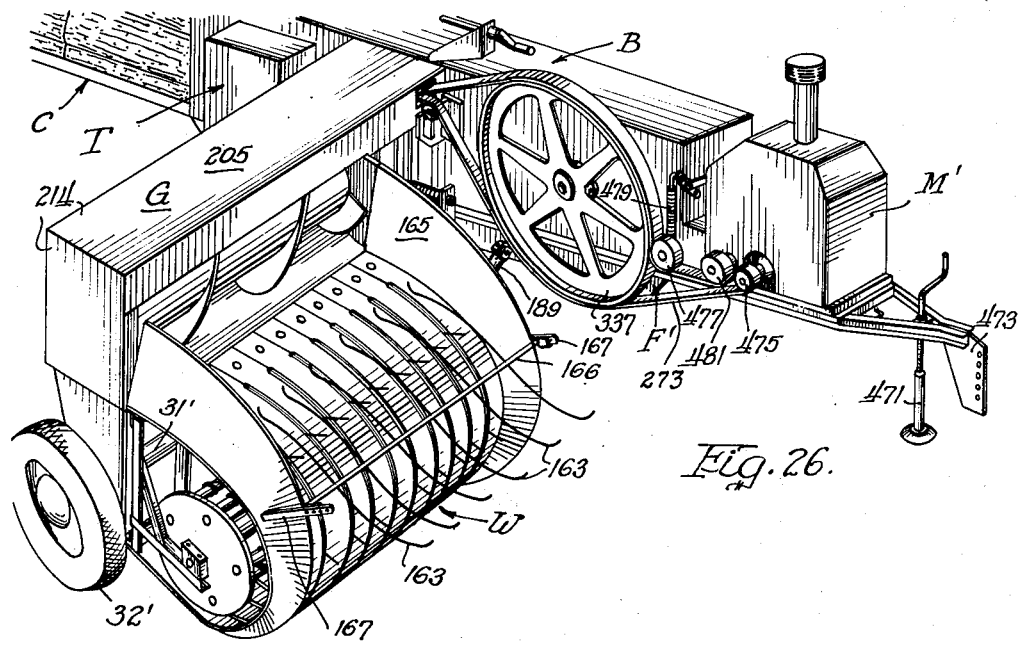
Fig. 26 is a perspective, fragmentary view showing a self-powered, pull-type baler embodying the features of the invention.

A self-powered, pull type baler incorporating various of the novel features of the invention is illustrated in Fig. 26. Except for certain details of the main frame F' and the drive mechanism, the baler illustrated in Fig. 26 is substantially identical with the baler previously described. The self-powered unit includes the pickup unit W, the feeding unit G, the baling chamber B, and the bale case C which have been described, and these elements are supported upon the frame F' in the same relative positions as the same elements are supported upon the frame F. As in the self-propelled implement, the main frame F' is generally T-shaped and includes an outrigger-like sub-frame 31', which is similar to the frame 31 on the self-propelled unit. The main frame F' is supported for movement on a pair of support wheels 32 and 33 which are journalled on an axle which forms a part of the outrigger-like frame 31'; this construction is the same as in the self-propelled unit.

The forward end of the longitudinal section of the frame F' is provided with an adjustable stand 471 which is adapted to support the forward end of the implement when it is not connected to a draft vehicle. The stand 471 is, of course, raised during the operation of the implement. A suitable hitching plate 473 is also provided at the forward portion of the frame F' so that the implement can be connected to the draft connection of a tractor or the like. In order to supply the power necessary to drive the various elements of the baler, a gasoline motor or the like M' is supported upon the forward portion of the frame F', rearwardly of the stand 471. The baling chamber B is supported upon the longitudinal section of the frame F' immediately to the rear of the motor M', and the bale case C is supported adjacent to, and to the rear of the baling chamber B.

The motor M' is provided with a drive pulley 475 which is adapted to be engaged by the main drive belt 273 which is the same as the drive belt employed in the self-propelled, self-powered unit. In order to provide the proper tension on the main drive belt, a belt-tightener pulley 477, biased by a spring 479, is attached to the baling chamber so as to engage the drive belt 273 adjacent the main flywheel 337. An idler pulley 481 is also provided adjacent the drive pulley 475 so that the belt 273 has the proper wrap around the driving pulley 475.

As above stated, the construction and arrangement of the windrow pick-up unit W, the feeding unit G, the baling chamber B, the bale case C, and the bale case wedge adjustment are identical with the structure which has been disclosed in the preceding description of the self-propelled baler. The pick-up unit W is driven from one of the support wheels in a manner similar to that employed in the self-propelled unit.

The operation of the self-powered, pull-type implement is identical with the operation of the self-propelled implement, with the exception that the speed of the implement along a windrow cannot be controlled as accurately as in the self-propelled unit which contained the novel variable V-belt drive of the invention.

Ground wheel driven baler

A baler in accordance with the invention, as before stated, can be powered from an operative connection to one of the support wheels. A baler of this type is extremely useful and economical when there is a medium sized tractor available to pull it through the field. The construction of the ground wheel driven baler is essentially the same as for the self-powered implement with the exception that it is not necessary to provide as long a main frame because there is no separate driving motor. Because all of the elements of the ground driven baler embody the same structural features as the self-propelled and the self-powered balers, the drawings illustrate only the features of the drive connections which are employed in the ground wheel driven implement (Figs. 25, 25a, and 25b).

The power connection between the support wheel 33a and the various elements of the implement includes a three-step sprocket 497 attached to and adapted to rotate with the support wheel 33a, and a three-step sprocket 499 which rotates on an extension of the baling piston crank shaft 333 (Fig. 25a). The three-step sprocket 499 may include, as an integral unit, an overriding, dog clutch 500 so that the forward motion of the implement can be retarded without regard to the inertia of the flywheel 337. The particular dog clutch 500 illustrated in Fig. 25b includes an outer housing 502 which is attached to the three-step sprocket 499, and an inner dog assemblage 504 which is fixedly attached to the crank shaft extension by means of a key 506. It should be noted that the multiple sprocket 499 itself is not attached to the shaft extension and it rotates free of the shaft except when it is moved in the forward direction at a speed which is the same as or greater than the speed of the shaft. The inner surface of the housing 502 is provided with a plurality of spaced-apart teeth 508 which are adapted to engage a pair of diametrically opposed, spring biased dogs 510 which form a part of the dog assemblage 504 attached to the crank shaft 333. In an alternate construction, the housing could be bolted to or otherwise attached to a flange or the like on the multiple sprocket 499.

The two, three-step sprockets are connected by a drive chain 501 which is adapted to engage cooperating pairs of the sprockets 497 and 499 to provide the desired speed ratio between the ground speed and the baling mechanism. The pickup unit W is conveniently driven by connecting the sprocket 465, which is keyed to the shaft 333, to the drive sprocket 467 for the pickup unit W by means of the chain 469, as in the case of stationary baling. Since the drive sprocket 467 and its supporting shaft, which extends to the pick-up W, rotate clockwise with the ground wheel 33a, it is necessary to provide a suitable drive reversing means in the drive connection with the shaft supporting the pick-up roll. This type of connection is, of course, possible in a ground driven unit because the crank shaft 333 runs at a speed which is relative to the ground speed of the implement.

Power take-off driven baler

The self-powered baler can be operated as a power take-off driven baler by simply substituting a power take-off connection for the driving motor M' of the self-propelled baler. The power take-off connection (Fig. 24) between the tractor and the implement includes a longitudinally extending shaft 483 which is journalled in a bearing 485 rigidly attached to the frame F' of the implement. A power transmission pulley 487 is keyed to the rearward end of the shaft 483 and the pulley 487 may include, as an integral part, an over-riding dog clutch which is similar to the dog clutch 500 described in connection with the ground wheel driven baler described in the preceding section. In order to connect the longitudinally extending drive belt 273 to the pulley 487 which has a transversely extending groove, it is necessary to provide a pair of belt-turning pulleys or mules 489 and 491 which may, as illustrated, be supported upon a unitary bracket 493 attached to the baling chamber B. Each of the pulleys 489 and 491 is rotatively journalled in suitable bearings and acts to guide the drive belt 273 around the corner of the baling chamber without kinking. A belt-tightener means (not shown) is also provided along the run of the main drive belt 273, to provide the proper belt tension, or the pulleys 489 or 491 may be adjustably supported to accomplish this function.

The forward end of the shaft 483 is connected through a suitable universal joint 495 to the power take-off of the tractor by the conventional power take-off shaft. As in the self-powered baler, there is no provision for accomplishing speed control with the same high degree of accuracy which is possible in the self-propelled implement, but the improved baling characteristics, the large capacity, the economy of operation, and the windrow moving feature are all present in this baler.

In the foregoing there has been described an improved baler construction the various features of which cooperate to form a baler of light weight and of large capacity. The means for feeding crop material into the baling chamber forms the material being baled into a thin, precompressed ribbon of substantially uniform thickness so that the power needed by the baling piston to compress the crop material is reduced and the length of stroke of the piston can be greatly shortened and the rate of the working strokes can be increased. The bales formed by a baling piston which is fed in accordance with the invention are of uniform density and have flat sides and sharp corners and the baled material is in thin, easily separable layers. The feeding unit of the invention is compact and may be enclosed so as to substantially eliminate safety hazards to persons in the vicinity of the operating apparatus and the unit contains no externally extending moving parts, as for example kickers, or tampers which are commonly used in prior art balers. Moreover, the feed belts of the invention substantially eliminate loss of crop materials and greatly reduce the number of leaves which are stripped from their stalks. The hinged bale case with its novel wedge adjustment permits the baler operator to adjust the density of the baled material as crop conditions change along the path of the baler. Closely controlled density in the bales results in well shaped bales having uniform weight and at the same time the quality of the hay in the bale will be improved by even curing.

In addition to the function of baling hay, a baler having a feeding unit in accordance with the invention can be used as a windrow mover. Windrow moving, wherein the windrowed material is moved without turning the material over, hastens drying while preserving the maximum nutritional value in the crop. Substantial increases in the productivity of a baler can be made when the windrow is moved at the beginning of a baling operation to hasten the curing of an overly moist portion of the crop.

The improved windrow pickup construction of the invention insures even and clean movement of the picked-up crop material into the feeding unit and a combined wind guard and safety guard, as herein disclosed, insures proper feeding even under light load conditions.

The self-propelled and self-powered baler is driven in relation to the condition of the crop by a novel, adjustable, V-belt drive. The operator of the baler can quickly and accurately control the speed of the baler along the ground so that the baling operation can be carried on at maximum speed. As has been stated in the description, the engine of the prime mover runs at a constant governed speed and this results in economy of operation and a minimum amount of wear on all of the moving parts.

Various of the features of the invention that are believed to be new are set forth in the appended claims.

I claim:

1. In a pick-up baler having an elongated mobile frame, a baler mechanism mounted on said frame, an outrigger frame mounted on said mobile frame in transversely extending relation thereto, and having a pick-up mechanism mounted on said outrigger frame, an improved feed means comprising a screw feed member rotatably mounted on said outrigger frame between said pick-up and baler mechanisms, said screw feed having a terminal end spaced from said baler mechanism, and a spaced, opposed pair of vertically disposed feed belts positioned between said terminal end of said screw feed and said baler mechanism, said feed belts being resiliently biased toward one another whereby material introduced between said belts by said screw feed is compressed and fed to said baler mechanism.

2. In a pick-up baler having an elongated mobile frame with its major axis extending in the direction of movement of said baler, a baler mechanism mounted on said frame, an outrigger frame mounted on said mobile frame and extending transversely from said mobile frame, and having a pick-up mechanism mounted on said outrigger frame, an improved feed means comprising a screw feed member mounted on said outrigger frame between said pick-up and baler mechanisms, said screw feed being rotatable about an axis generally normal to the major axis of said main frame and having a terminal end spaced from said baler mechanism, and a spaced opposed pair of vertically disposed feed belts positioned between said terminal end of said screw feed and said baler mechanism, said feed belts being resiliently biased toward one another whereby material introduced between said baler by said screw feed is compressed and fed to said baler mechanism.

3. In a pick-up baler having an elongated mobile frame with its major axis extending in the direction of movement of said baler, a baler mechanism mounted on said frame, an outrigger frame mounted on said mobile frame and extending transversely from said mobile frame, and having a pick-up mechanism mounted on said outrigger frame, an improved feed means comprising a screw feed member mounted on said outrigger frame between said pick-up and baler mechanisms, said screw feed being rotatable about an axis generally normal to the major axis of said main frame and having a terminal end spaced from said baler mechanism, and a spaced opposed pair of vertically disposed feed belts positioned between said terminal end of said screw feed and said baler mechanism, one of said belts being movable toward and away from the other, and resilient means for urging said movable belt toward said other belt whereby material introduced between said belts by said screw feed is compressed and fed to said baler mechanism.

4. In a pick-up baler having an elongated mobile frame with its major axis extending in the direction of movement of said baler, a baler mechanism mounted on said frame, an outrigger frame mounted on said mobile frame and extending transversely from said mobile frame, and having a pick-up mechanism mounted on said outrigger frame, an improved feed means comprising a screw feed member rotatably mounted on said outrigger frame between said pick-up and baler mechanisms, said screw feed member being rotatable about an axis generally normal to the major axis of said main frame and having a terminal end spaced from said baler mechanism, a spaced opposed pair of vertically disposed feed belts positioned between said terminal end of said screw feed and said baler mechanism, said feed belts being resiliently biased toward one another, and a stripper bar disposed along said screw feed member whereby material received by said screw feed is moved along a straight line to said belts where it is compressed and fed to said baler mechanism.

5. In a pick-up baler having an elongated mobile frame, a baler mechanism mounted on said frame including a baling chamber having an opening for receiving material to be baled, a piston mounted for reciprocation in said chamber, a knife carried by said plunger for severing material entering said chamber through said opening on each stroke of said piston, an outrigger frame mounted on said mobile frame in transversely extending relation thereto, and having a pick-up mechanism mounted on said outrigger frame, an improved feed means comprising a screw feed member rotatably mounted on said outrigger frame between said pick-up and baler mechanism, said screw feed having a terminal end spaced from said baling chamber opening, and a spaced opposed pair of vertically disposed feed belts positioned between said terminal end of said screw feed and said baling chamber opening, said feed belts being resiliently biased toward one another whereby material introduced between said belts by said screw feed member is compressed into a thin ribbon of substantially uniform thickness and fed through said baling chamber opening for severance by said knife in predetermined lengths for baling.

6. A feeding and baling means for use in a baler of the class described comprising a supporting frame structure, a baling chamber mounted on said frame, said chamber having an opening for receiving material to be baled, a piston reciprocably mounted in said chamber for compressing material fed into said chamber, an improved feed means comprising a screw feed member rotatably mounted on said supporting frame structure, said screw feed having a terminal end spaced from the opening in said baling chamber, and a spaced opposed pair of vertically disposed feed belts positioned between said terminal end of said screw feed and said opening in said baling chamber, said feed belts being resiliently biased toward one another whereby material introduced between said belts by said screw feed is compressed and fed to said baling chamber.

7. A feeding and baling means for use in a baler of the class described comprising a supporting frame structure, a baling chamber mounted on said frame, said chamber having an opening for receiving material to be baled, a piston reciprocably mounted in said chamber for compressing material fed into said chamber, an improved feed means comprising a screw feed member rotatably mounted on said supporting frame structure, said screw feed having a terminal end spaced from the opening in said baling chamber, a spaced opposed pair of vertically disposed feed belts positioned between said terminal end of said screw feed and said opening in said baling chamber, one of said belts being movable toward and away from the other, and resilient means for urging said movable belt toward said other belt whereby material introduced between said belts by said screw feed is compressed and fed into said baling chamber.

8. A feeding and baling means for use in a baler of the class described comprising a supporting frame structure, a baling chamber mounted on said frame, said chamber having an opening for receiving material to be baled, a piston reciprocably mounted in said chamber for compressing material fed into said chamber, an improved feed means comprising a screw feed member rotatably mounted on said supporting frame structure, said screw feed having a terminal end spaced from the opening in said baling chamber, a spaced opposed pair of vertically disposed feed belts positioned between said terminal end of said screw feed and said opening in said baling chamber, said feed belts being resiliently biased toward one another, and a stripper bar disposed along said screw feed means whereby material received by said screw feed is moved along a straight line to said belts where it is compressed and fed into said baling chamber.

9. A feeding and baling means for use in a baler of the class described comprising a supporting frame structure, a baling chamber mounted on said frame, said chamber having an opening for receiving material to be baled, a piston reciprocably mounted in said chamber for compressing material fed into said chamber, an improved feed means comprising a screw feed member rotatably mounted on said supporting frame structure, said screw feed having a terminal end spaced from the opening in said baling chamber, a spaced opposed pair of vertically disposed feed belts positioned between said terminal end of said screw feed and said opening in said baling chamber, said feed belts being resiliently biased toward one another, each of said belts including a material engaging zone through which the belts pass longitudinally, and means mounted on said frame for maintaining each belt in the material engaging zone thereof.

10. A feeding and baling means for use in a baler of the class described comprising a supporting frame structure, a baling chamber mounted on said frame, said chamber having an opening for receiving material to be baled, a piston reciprocably mounted in said chamber for compressing material fed into said chamber, a knife mounted on said piston adjacent said opening in said chamber for severing material fed into said chamber through said opening on each stroke of said piston, an improved feed means comprising a screw feed member rotatably mounted on said supporting frame, said screw feed having a terminal end spaced from the opening in said baling chamber, and a spaced opposed pair of vertically disposed feed belts positioned between said terminal end of said screw feed and said opening in said baling chamber, said feed belts being resiliently biased toward one another whereby material introduced between said belts by said screw feed member is compressed into a thin ribbon of substantially uniform thickness and fed through said baling chamber opening for severance by said knife in predetermined lengths for baling.

References Cited in the file of this patent

UNITED STATES PATENTS

| Number | Name | Date |
|---|---|---|
| 452,730 | Pessano | May 19, 1891 |
| 454,422 | Brown | June 16, 1891 |
| 521,511 | Schulze | June 19, 1894 |
| 749,512 | Anderson | Jan. 12, 1904 |
| 787,008 | Taylor | Apr. 11, 1905 |
| 822,511 | Davis | June 5, 1906 |
| 831,301 | Ryther | Sept. 18, 1906 |
| 949,767 | House | Feb. 22, 1910 |
| 1,029,422 | Cashon | June 11, 1912 |
| 1,050,032 | Lapke | Jan. 7, 1913 |
| 1,153,103 | Neale | Sept. 17, 1915 |
| 1,227,355 | Wright | May 22, 1917 |
| 1,235,794 | Hardaker | Aug. 7, 1917 |
| 1,241,981 | Hudson | Oct. 2, 1917 |
| 1,247,233 | Dement | Nov. 20, 1917 |
| 1,285,895 | Armstrong | Nov. 26, 1918 |
| 1,521,865 | Cameron | Jan. 6, 1925 |
| 1,631,881 | Murray | June 7, 1927 |
| 1,905,410 | Innes | Apr. 25, 1933 |
| 1,908,807 | Ashley | May 16, 1933 |
| 2,205,278 | Russell | June 18, 1940 |
| 2,260,798 | Burns | Oct. 28, 1941 |
| 2,324,261 | Krause | July 13, 1943 |
| 2,337,739 | Crumb et al. | Dec. 28, 1943 |
| 2,343,583 | Rogers | Mar. 7, 1944 |
| 2,352,388 | Jones | June 27, 1944 |
| 2,362,861 | Russell | Nov. 15, 1944 |
| 2,381,620 | Russell | Aug. 7, 1945 |
| 2,382,935 | Armitage | Aug. 14, 1945 |
| 2,421,037 | Ronning | May 27, 1947 |
| 2,431,828 | Raney | Dec. 2, 1947 |
| 2,446,878 | Kaupke et al. | Aug. 10, 1948 |
| 2,450,082 | Crumb et al. | Sept. 28, 1948 |
| 2,464,684 | Hill | Mar. 15, 1949 |
| 2,480,968 | Ronai | Sept. 6, 1949 |
| 2,489,199 | Russell | Nov. 22, 1949 |
| 2,527,887 | Martin | Oct. 31, 1950 |
| 2,572,180 | Morrison | Oct. 23, 1951 |

FOREIGN PATENTS

| Number | Country | Date |
|---|---|---|
| 5,447 | Great Britain | 1914 |
| 162,378 | Great Britain | Apr. 27, 1921 |
| 326,494 | Great Britain | Mar. 14, 1930 |
| 726,592 | France | Mar. 7, 1932 |
| 509,048 | Great Britain | June 27, 1939 |